(12) United States Patent
Johnson et al.

(10) Patent No.: US 12,325,079 B2
(45) Date of Patent: Jun. 10, 2025

(54) INDEXABLE PIERCING TIP FOR DEMOLITION SHEARS

(71) Applicant: EPIROC INDUSTRIAL TOOLS AND ATTACHMENTS LLC, Milwaukie, OR (US)

(72) Inventors: Karl Johnson, Duluth, MN (US); Clayton Sederberg, Duluth, MN (US); Shane Bubacz, Duluth, MN (US); Matthew George Mecklin, Two Harbors, MN (US); Robert Laine Blettner, Two Harbors, MN (US)

(73) Assignee: EPIROC INDUSTRIAL TOOLS AND ATTACHMENTS LLC, Milwaukie, OR (US)

( * ) Notice: Subject to any disclaimer, the term of this patent is extended or adjusted under 35 U.S.C. 154(b) by 556 days.

(21) Appl. No.: 17/047,865

(22) PCT Filed: Apr. 10, 2019

(86) PCT No.: PCT/US2019/026827
§ 371 (c)(1),
(2) Date: Oct. 15, 2020

(87) PCT Pub. No.: WO2019/209537
PCT Pub. Date: Oct. 31, 2019

(65) Prior Publication Data
US 2021/0154753 A1    May 27, 2021

Related U.S. Application Data

(60) Provisional application No. 62/661,396, filed on Apr. 23, 2018.

(51) Int. Cl.
*B23D 35/00* (2006.01)
*B23D 31/00* (2006.01)
(Continued)

(52) U.S. Cl.
CPC ......... *B23D 35/005* (2013.01); *B23D 31/008* (2013.01); *B23D 35/001* (2013.01);
(Continued)

(58) Field of Classification Search
CPC .. B23D 35/005; B23D 35/001; B23D 35/002; B23D 31/008; E02F 3/965; E04G 23/082
(Continued)

(56) References Cited

U.S. PATENT DOCUMENTS

| | | | |
|---|---|---|---|
| 8,104,384 B2 | 1/2012 | Wilkins et al. | |
| 8,146,256 B2 | 4/2012 | Johnson et al. | |

(Continued)

FOREIGN PATENT DOCUMENTS

| | | | | |
|---|---|---|---|---|
| EP | 1 939 362 | | 7/2008 | |
| GB | 2595346 A | * | 11/2021 | ........... B23D 31/008 |

(Continued)

OTHER PUBLICATIONS

International Search Report issued for International Patent Application No. PCT/US2019/026827, dated Sep. 11, 2019.

(Continued)

*Primary Examiner* — Adam J Eiseman
*Assistant Examiner* — Fernando A Ayala
(74) *Attorney, Agent, or Firm* — Pillsbury Winthrop Shaw Pittman LLP

(57) ABSTRACT

An indexable piercing tip mounts to a nose portion of one of the jaws of a heavy-duty demolition shears so as to enclose and protect top, bottom, front, and two opposing side surfaces of the nose portion during use of the shears. The piercing tip has a first operative position in which a first set of piercing and shearing edges of the piercing tip are presented for use. When the first set gets dull or worn, the (Continued)

piercing tip can be rotated/indexed 180° degrees so as to present a second set of piercing and shearing edges of the piercing tip for use.

35 Claims, 16 Drawing Sheets

(51) Int. Cl.
    *E02F 3/96* (2006.01)
    *E04G 23/08* (2006.01)
(52) U.S. Cl.
    CPC ............ *B23D 35/002* (2013.01); *E02F 3/965* (2013.01); *E04G 23/082* (2013.01)
(58) Field of Classification Search
    USPC ............................................................ 83/694
    See application file for complete search history.

(56) References Cited

U.S. PATENT DOCUMENTS

| | | | |
|---|---|---|---|
| 8,650,759 B2 | 2/2014 | Johnson et al. | |
| 9,333,570 B2 | 5/2016 | Clemons et al. | |
| 9,713,848 B2* | 7/2017 | Christenson | B23D 17/00 |
| 2005/0091852 A1* | 5/2005 | Johnson | B23D 31/008 |
| | | | 30/134 |
| 2006/0005395 A1* | 1/2006 | Sederberg | E02F 3/965 |
| | | | 30/228 |
| 2007/0001041 A1* | 1/2007 | Christenson | E02F 3/3609 |
| | | | 241/101.73 |
| 2007/0130776 A1* | 6/2007 | Grant | B23D 31/008 |
| | | | 30/134 |
| 2008/0028619 A1 | 2/2008 | Bubacz et al. | |
| 2008/0072434 A1* | 3/2008 | Clemons | B23D 35/001 |
| | | | 30/194 |
| 2012/0111171 A1 | 5/2012 | Johnson et al. | |
| 2013/0320122 A1* | 12/2013 | Ko | B02C 1/02 |
| | | | 241/101.71 |
| 2015/0197917 A1* | 7/2015 | Clemons | B23D 35/001 |
| | | | 241/101.73 |
| 2015/0308075 A1* | 10/2015 | Christenson | E02F 3/965 |
| | | | 30/134 |
| 2015/0308076 A1* | 10/2015 | Christenson | E02F 9/2883 |
| | | | 30/134 |
| 2016/0059328 A1* | 3/2016 | Jacobson | B23D 17/00 |
| | | | 30/249 |
| 2016/0348338 A1* | 12/2016 | Christenson | E02F 3/965 |
| 2017/0036281 A1* | 2/2017 | Christenson | B23D 35/001 |

FOREIGN PATENT DOCUMENTS

| | | | | |
|---|---|---|---|---|
| JP | 2003-311168 | | 11/2003 | |
| JP | 2007-509766 | | 4/2007 | |
| JP | 2011252299 A | * | 12/2011 | ........... B23D 31/008 |
| JP | 2013-204282 | * | 3/2012 | |
| JP | 2016-518541 | | 6/2016 | |
| WO | WO-2007069893 A1 | * | 6/2007 | ........... B23D 31/008 |
| WO | 2008/079005 | | 7/2008 | |
| WO | WO-2015164344 A1 | * | 10/2015 | ............. B23D 17/00 |
| WO | 2017/132705 | | 8/2017 | |

OTHER PUBLICATIONS

Written Opinion of the International Searching Authority issued for International Patent Application No. PCT/US2019/026827, dated Mar. 20, 2020.
International Preliminary Report on Patentability issued in corresponding International Patent Application No. PCT/US2019/026827, dated Oct. 28, 2020.
Notice of Allowance issued in corresponding Japanese Patent Application No. 2020-555217, dated Jan. 17, 2023.

* cited by examiner

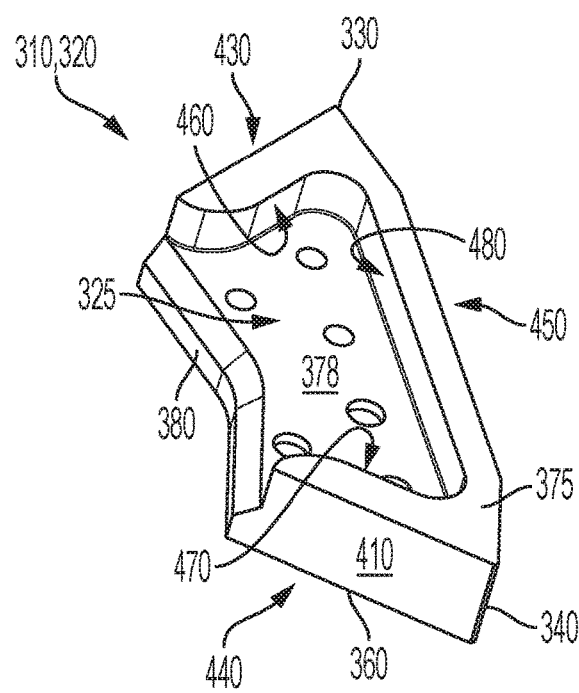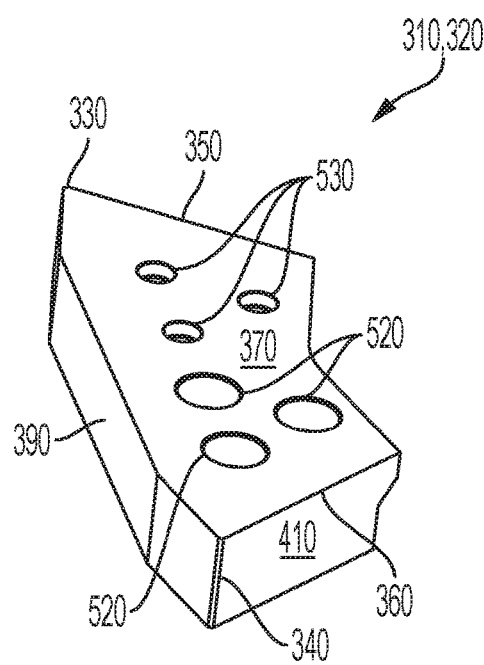
FIG. 5　　　FIG. 6
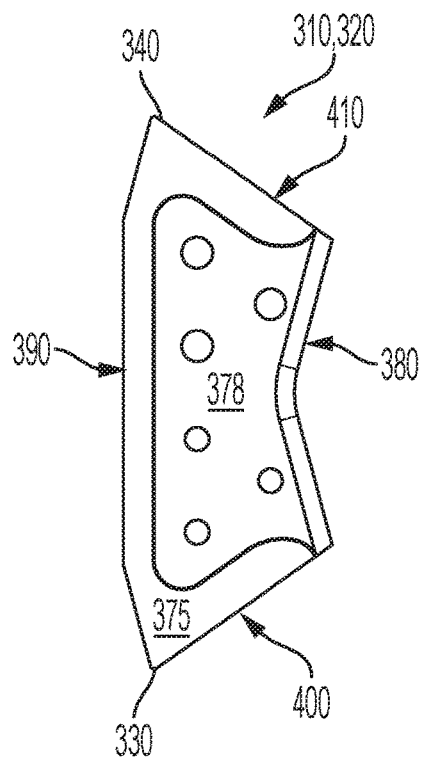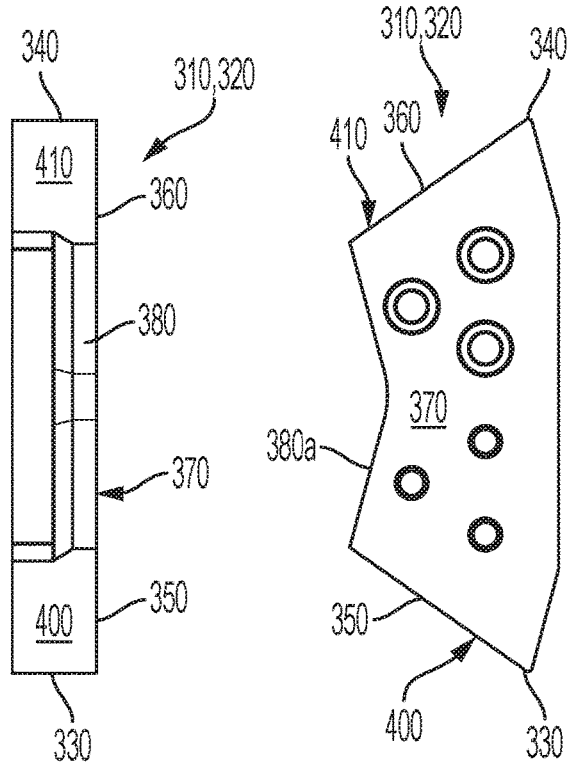
FIG. 7　　FIG. 8　　FIG. 9

US 12,325,079 B2

INDEXABLE PIERCING TIP FOR DEMOLITION SHEARS

CROSS-REFERENCE TO RELATED APPLICATIONS

This application is the U.S. National Stage of PCT/US2019/026827, filed Apr. 10, 2019, which in turn claims the benefit of priority from U.S. Provisional Patent Application No. 62/661,396, filed Apr. 23, 2018, titled "Indexable Piercing Tip For Demolition Shears," the entire contents of which are hereby incorporated by reference herein.

BACKGROUND

1. Field of the Invention

Various embodiments relate generally to heavy-duty demolition shears and piercing tips for such shears.

2. Description of Related Art

Conventional heavy-duty demolition shears are configured to attach to the boom structure of, for example, excavating or earth-moving excavation equipment such as that made by Caterpillar, Komatsu, Hitachi, Kobelco, etc. The shears often include a lower, fixed or stationary jaw and an upper, movable jaw. The upper, movable jaw is pivotally mounted (e.g., via a pivot pin or other hinge mechanism) relative to the lower fixed or stationary jaw. A linear actuator (e.g., pneumatic or hydraulic cylinder) articulates (drives) the upper, movable jaw for such pivoting movement. The stationary jaw mounts into a stick weldment structure that supports the actuator and the pivoting upper jaw, and the stick weldment structure is mated to the boom of the machinery via a mounting bracket and/or a rotational mounting adapter and rotational drive system. Replaceable blade inserts are bolted to the jaws so as to be repositionable (indexable) and replaceable.

Heavy duty shears commonly include replaceable piercing tips that are configured to pierce a work piece when the jaws of the shears close. See, e.g., U.S. Pat. Nos. 8,650,759, 9,333,570, and 9,713,848 and U.S. Patent Application Publication No. 2016/0059328.

SUMMARY

One or more non-limiting embodiments provide a demolition shears that includes: a first jaw; and a second jaw operatively connected to the first jaw for movement relative to the first jaw. The second jaw includes a jaw body with a nose portion with top, bottom, front, and two opposing side surfaces, and an indexable piercing tip comprising first and second piercing edges and first and second shearing edges. The indexable piercing tip is selectively attachable to the nose portion in: (1) a first operative position in which the first piercing edge is presented for piercing use and the first shearing edge is presented for shearing use, or (2) a second operative position in which the second piercing edge is presented for piercing use and the second shearing edge is presented for shearing use. When the indexable piercing tip is in the first or second operative positions, the indexable piercing tip encloses a majority of the top surface of the nose portion, a majority of the bottom surface of the nose portion, a majority of the front surface of the nose portion, and a majority at least one (or both) of the two opposing side surfaces of the nose portion. The second operative position is a position in which the indexable piercing tip is rotated 180° relative to the first operative position.

According to one or more of these embodiments, the indexable piercing tip comprises a first body (e.g., made of metal, a composite, etc.) and a second body (e.g., made of metal, a composite, etc.) that sandwich the nose portion therebetween when the indexable piercing tip is in the first or second operative position.

According to one or more of these embodiments, the first body has the same shape as the second body.

According to one or more of these embodiments, the relative positions of the first and second bodies may be switched to switch from the indexable piercing tip from the first operative position to the second operative position.

According to one or more of these embodiments: the first body defines a portion of the first piercing edge and a portion of the second piercing edge; and the second body defines a portion of the first piercing edge and a portion of the second piercing edge.

According to one or more of these embodiments, the first body defines the first shearing edge, and the second body defines the second shearing edge.

According to one or more of these embodiments, the first body comprises a front wall that encloses a portion of the front surface of the nose portion when the indexable piercing tip is in the first or second operative position; and the second body comprises a front wall that encloses a portion of the front surface of the nose portion when the indexable piercing tip is in the first or second operative position.

According to one or more of these embodiments: the first body defines a portion of the first piercing edge and defines a portion of the second piercing edge; the second body defines a portion of the first piercing edge and defines a portion of the second piercing edge; when the indexable piercing tip is in the first operative position, a surface of the first body and a surface of the second body face the bottom surface of the nose portion; and when the indexable piercing tip is in the second operative position, a surface of the first body and a surface of the second body face the bottom surface of the nose portion.

According to one or more of these embodiments: the first body comprises a first wall that faces and encloses a portion of the bottom surface of the nose portion when the piercing tip is in the first operative position; the first wall of the first body faces and encloses a portion of the top surface of the nose portion when the piercing tip is in the second operative position; the second body comprises a first wall that faces and encloses a portion of the bottom surface of the nose portion when the piercing tip is in the first operative position; the first wall of the second body faces and encloses a portion of the top surface of the nose portion when the piercing tip is in the second operative position; the first body comprises a second wall that faces and encloses a portion of the top surface of the nose portion when the piercing tip is in the first operative position; the second wall of the first body faces and encloses a portion of the bottom surface of the nose portion when the piercing tip is in the second operative position; the second body comprises a second wall that faces and encloses a portion of the top surface of the nose portion when the piercing tip is in the first operative position; and the second wall of the second body faces and encloses a portion of the bottom surface of the nose portion when the piercing tip is in the second operative position.

According to one or more of these embodiments, the first body defines the entire first piercing edge, and the second body defines the entire second piercing edge.

According to one or more of these embodiments, the first body defines the entire first piercing edge, the entire second piercing edge, the entire first shearing edge, and the entire second shearing edge.

According to one or more of these embodiments, the second body encloses the entire front surface.

According to one or more of these embodiments: when the indexable piercing tip is in the first operative position, the first body faces and encloses a first of the two opposing side surfaces and the second body faces and encloses a second of the two opposing side surfaces; and when the indexable piercing tip is in the second operative position, the first body buts and encloses the second of the two opposing side surfaces and the second body faces and encloses the first of the two opposing side surfaces.

According to one or more of these embodiments: the first body includes a threaded hole and a non-threaded through hole; second body includes a threaded hole and a non-threaded through hole; the threaded hole of the first body is co-axial with the non-threaded through hole of the second body when the indexable piercing tip is in the first or second operative positions; the threaded hole of the second body is co-axial with the non-threaded through hole of the first body when the indexable piercing tip is in the first or second operative positions; the shears further comprise a first bolt that extends through the non-threaded through hole of the first body and threads into the threaded hole of the second body; and the shears further comprise a second bolt that extends through the non-threaded through hole of the second body and threads into the threaded hole of the first body.

According to one or more of these embodiments, the nose portion comprises laterally-extending through holes, and the first and second bolts extend through respective ones of the laterally-extending through holes of the nose portion.

According to one or more of these embodiments: the nose portion includes first and second through holes; when the indexable piercing tip is in the first operative position, (1) the first through hole of the nose portion is co-axial with the threaded hole of the first body and non-threaded hole of the second body, and (2) the second through hole of the nose portion is co-axial with the threaded hole of the second body and non-threaded hole of the first body; and when the indexable piercing tip is in the second operative position, (1) the second through hole of the nose portion is co-axial with the threaded hole of the first body and non-threaded hole of the second body, and (2) the first through hole of the nose portion is co-axial with the threaded hole of the second body and non-threaded hole of the first body.

According to one or more of these embodiments, the shears includes: an actuator operatively extending between the first and second jaws to cause the first and second jaws to selectively open and close; and a mount shaped and configured to attach the shears to a boom of machinery.

According to one or more of these embodiments, the second jaw is pivotally connected to the first jaw for relative pivotal movement about a jaw axis, and the nose portion is 180° rotationally symmetrical about a nose portion axis that is perpendicular to the jaw axis.

One or more non-limiting embodiments provide a replacement piercing tip for use in the shears according to one or more of these embodiments.

One or more non-limiting embodiments provide the piercing tip according to one or more of these embodiments.

One or more non-limiting embodiments provide a second jaw according to one or more of these embodiments.

One or more non-limiting embodiments provide an indexable piercing tip shaped and configured to be attached to a nose portion of a jaw of a demolition shears. The indexable piercing tip comprises a first body and a second body. The indexable piercing tip forms first and second piercing edges and first and second shearing edges. The indexable piercing tip is shaped and configured to be selectively attachable to the nose portion in: (1) a first operative position in which the first piercing edge is presented for piercing use, and the first shearing edge is presented for shearing use, or (2) a second operative position in which the second piercing edge is presented for piercing use and the second shearing edge is presented for shearing use. The first and second bodies are shaped and configured to sandwich the nose portion therebetween when the indexable piercing tip is in the first or second operative position. The indexable piercing tip is shaped and configured such that when the indexable piercing tip is in the first or second operative positions, the indexable piercing tip encloses a majority of a top surface of the nose portion, a majority of a bottom surface of the nose portion, a majority of a front surface of the nose portion, and a majority at least one of two opposing side surfaces of the nose portion. The second operative position is a position in which the indexable piercing tip is rotated 180° relative to the first operative position.

According to one or more of these embodiments, the first body has the same shape as the second body.

According to one or more of these embodiments, the relative positions of the first and second bodies may be switched to switch from the indexable piercing tip from the first operative position to the second operative position.

According to one or more of these embodiments: the first body defines a portion of the first piercing edge and a portion of the second piercing edge; and the second body defines a portion of the first piercing edge and a portion of the second piercing edge.

According to one or more of these embodiments, the first body defines the first shearing edge, and the second body defines the second shearing edge.

According to one or more of these embodiments, the first body comprises a front wall that is shaped and configured to enclose a portion of the front surface of the nose portion when the indexable piercing tip is in the first or second operative position, and the second body comprises a front wall that is shaped and configured to enclose a portion of the front surface of the nose portion when the indexable piercing tip is in the first or second operative position.

According to one or more of these embodiments, the first body defines a portion of the first piercing edge and defines a portion of the second piercing edge; the second body defines a portion of the first piercing edge and defines a portion of the second piercing edge; the indexable piercing tip is shaped and configured such that when the indexable piercing tip is in the first operative position, a surface of the first body and a surface of the second body face the bottom surface of the nose portion; and the indexable piercing tip is shaped and configured such that when the indexable piercing tip is in the second operative position, a surface of the first body and a surface of the second body face the bottom surface of the nose portion.

According to one or more of these embodiments: the first body comprises a first wall that is shaped and configured to face and enclose a portion of the bottom surface of the nose portion when the piercing tip is in the first operative position; the first wall of the first body is shaped and configured to face and enclose a portion of the top surface of the nose portion when the piercing tip is in the second operative position; the second body comprises a first wall that is shaped and configured to face and enclose a portion of the bottom surface of the nose portion when the piercing tip is in the first operative position; the first wall of the second body is shaped and configured to face and enclose a portion of the top surface of the nose portion when the piercing tip is in the second operative position; the first body comprises a second wall that is shaped and configured to face and enclose a portion of the top surface of the nose portion when the piercing tip is in the first operative position; the second wall of the first body is shaped and configured to face and enclose a portion of the bottom surface of the nose portion when the piercing tip is in the second operative position; the second body comprises a second wall that is shaped and configured to face and enclose a portion of the top surface of the nose portion when the piercing tip is in the first operative position; and the second wall of the second body is shaped and configured to face and enclose a portion of the bottom surface of the nose portion when the piercing tip is in the second operative position.

According to one or more of these embodiments, the first body defines the entire first piercing edge, and the second body defines the entire second piercing edge.

According to one or more of these embodiments, the first body defines the entire first piercing edge, the entire second piercing edge, the entire first shearing edge, and the entire second shearing edge.

According to one or more of these embodiments, the second body is shaped and configured to face and enclose encloses the entire front surface when the piercing tip is in the first or second operative position.

According to one or more of these embodiments, the indexable piercing tip is shaped and configured such that: when the indexable piercing tip is in the first operative position, the first body faces and encloses a first of the two opposing side surfaces and the second body faces and encloses a second of the two opposing side surfaces; and when the indexable piercing tip is in the second operative position, the first body buts and encloses the second of the two opposing side surfaces and the second body faces and encloses the first of the two opposing side surfaces.

According to one or more of these embodiments: the first body includes a threaded hole and a non-threaded through hole; second body includes a threaded hole and a non-threaded through hole; the threaded hole of the first body is co-axial with the non-threaded through hole of the second body when the indexable piercing tip is in the first or second operative positions; the threaded hole of the second body is co-axial with the non-threaded through hole of the first body when the indexable piercing tip is in the first or second operative positions; the piercing tip is shaped and configured to be attached to the nose portion by extending a first bolt through the non-threaded through hole of the first body and threading the first bolt into the threaded hole of the second body; and the piercing tip is shaped and configured to be attached to the nose portion by extending a second bolt through the non-threaded through hole of the second body and threading the second bolt into the threaded hole of the first body.

According to one or more of these embodiments, the threaded and non-threaded holes of the first body and threaded and non-threaded holes of the second body are positioned to as to be co-axial with corresponding laterally-extending through holes in the nose portion such that the first and second bolts extend through respective ones of the laterally-extending through holes of the nose portion to attach the piercing tip to the shears.

According to various embodiments, when the piercing tip is in the first or second operative position, the piercing tip seats against each of the top, bottom, front, and both side surfaces of the nose portion.

According to various embodiments, when the piercing tip is in the first or second operative position, the piercing tip encloses:

(1) more than 20, 30, 40, 50, 60, 70, 80, 90, and/or 95% of an area of the top surface of the nose portion;

(2) more than 20, 30, 40, 50, 60, 70, 80, 90, and/or 95% of an area of the bottom surface of the nose portion;

(3) more than 20, 30, 40, 50, 60, 70, 80, 90, and/or 95% of an area of the front surface of the nose portion;

(4) more than 20, 30, 40, 50, 60, 70, 80, 90, and/or 95% of an area of the shearing-side side surface of the nose portion; and/or (5) more than 20, 30, 40, 50, 60, 70, 80, 90, and/or 95% of an area of the guide-side side surface of the nose portion.

One or more embodiments provide an indexable piercing tip shaped and configured to be attached to a nose portion of a jaw of a demolition shears. The indexable piercing tip comprises a first body and a second body. The indexable piercing tip forms first and second piercing edges and first and second shearing edges. The indexable piercing tip is shaped and configured to be selectively attachable to the nose portion in: (1) a first operative position in which the first piercing edge is presented for piercing use, and the first shearing edge is presented for shearing use, or (2) a second operative position in which the second piercing edge is presented for piercing use and the second shearing edge is presented for shearing use. The first and second bodies are shaped and configured to sandwich the nose portion therebetween when the indexable piercing tip is in the first or second operative position. The indexable piercing tip is shaped and configured such that when the indexable piercing tip is in the first or second operative positions, the indexable piercing tip protects a top surface of the nose portion, a bottom surface of the nose portion, a front surface of the nose portion, and both of two opposing side surfaces of the nose portion. The second operative position is a position in which the indexable piercing tip is rotated 180° relative to the first operative position.

One or more of these and/or other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranges, 2-10, 1-9, 3-9, etc. Similarly, where multiple parameters (e.g., parameter C, parameter D) are separately disclosed as having ranges, the embodiments disclosed herein explicitly include embodiments that combine any value within the disclosed range of one parameter (e.g., parameter C) with any value within the disclosed range of any other parameter (e.g., parameter D).

BRIEF DESCRIPTION OF THE DRAWINGS

For a better understanding of various embodiments as well as other objects and further features thereof, reference is made to the following description which is to be used in conjunction with the accompanying drawings, where:

FIGS. 5 and 6 are perspective views of a metal body of a piercing tip of the upper jaw of FIG. 3;

FIG. 7 is an inner side view of the metal body of FIGS. 5 and 6;

FIG. 8 is a rear view of the metal body of FIGS. 5 and 6;

FIG. 9 is an outer side view of the metal body of FIGS. 5 and 6;

DETAILED DESCRIPTION OF EXEMPLARY EMBODIMENTS

Figure 1:
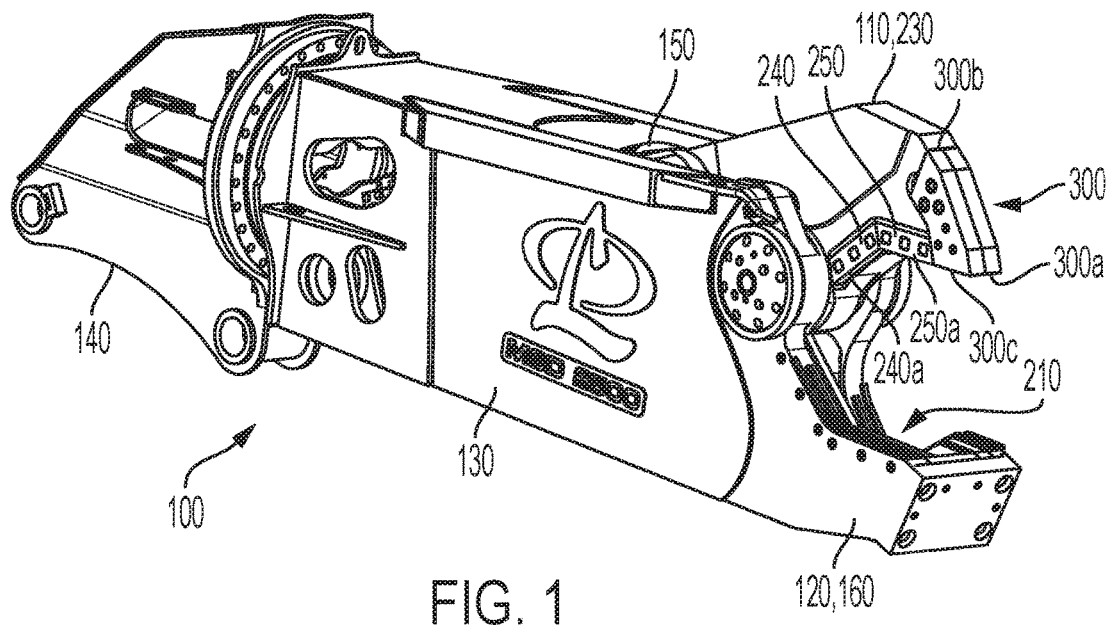
FIG. 1 is a front/side perspective view of a shears according to an embodiment.
Figure 2:
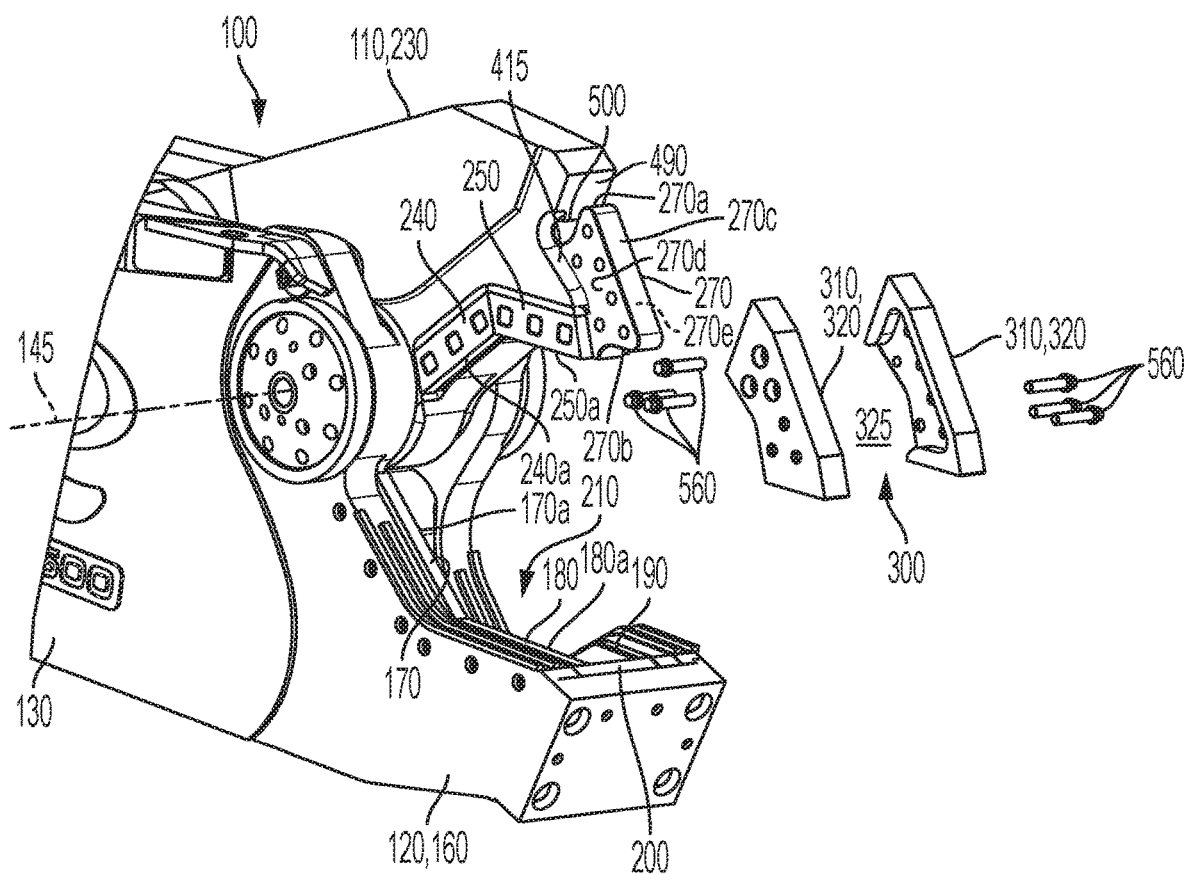
FIG. 2 is a partial, partially-exploded, front/side perspective view of the shears of FIG. 1.

FIGS. 1-9 illustrate a shears 100 according to a non-limiting embodiment. As shown in FIGS. 1-2, the shears 100 include an upper, movable jaw 110 and a lower, fixed jaw 120.

As shown in FIG. 1, the lower jaw 120 is rigidly mounted to a stick/frame 130 with a mounting bracket 140 that is configured to mount the shears 100 to a construction vehicle (e.g., the boom of an excavator, back hoe, etc.). For example, such a construction vehicle may comprise excavating or earth-moving excavation equipment such as that made by Caterpillar, Komatsu, Hitachi, Kobelco, etc.

As shown in FIG. 2, the jaws 110, 120 pivotally connect to each other at a laterally-extending pivot axis 145 such that each jaw 110, 120 is pivotally movable relative to the other jaw 110, 120. In the illustrated embodiments, the upper jaw 110 is movable relative to the lower fixed jaw 120 and stick 130. However, according to alternative embodiments, both jaws 110, 120 are movable relative to a stick/frame and a construction vehicle to which the shears is attached (e.g., universal processing shears).

As shown in FIG. 2, the pivotal connection between the jaws 110, 120 defines a jaw pivot axis 145 and may be formed by any suitable structure (e.g., an axle and bearings, the pivotal connection disclosed in U.S. Pat. No. 8,146,256 or 8,104,384 or U.S. Patent Application Publication No. 2008/0028619, the entire contents of each of which are hereby incorporated herein by reference).

As shown in FIG. 1, a hydraulic piston/cylinder 150 operatively connects to the first and second jaws 110, 120 and is configured to pivotally drive the upper jaw 110 relative to the lower jaw 120 in a shearing motion to open and close the shears 100. FIG. 1 illustrates the shears 100 in an open position. While the illustrated shears 100 use a hydraulic piston/cylinder 150 to drive the shearing motion of the jaws 110, 120, any other suitable actuator may alternatively be used without deviating from the scope of various embodiments (e.g., pneumatic piston/cylinder, linear or rotational actuator, etc.).

As shown in FIG. 2, the lower jaw 120 comprises a main lower jaw body 160. The lower jaw 120 also includes two shearing blades 170, 180 that detachably mount (e.g., via bolts, wedge blocks, etc.) to the jaw body 160 (either directly or by way of an intermediate blade holder (not shown)). Alternatively, the blades 170 and/or 180 may be integrally formed with the jaw body 160. The shearing blades 170, 180 define shearing edges 170a, 180a. The lower jaw 120 also includes a guide blade 190 that mounts to the jaw body 160 (or is integrally formed therewith) and is laterally spaced from and extends parallel to the shearing edges 170a, 180a. The lower jaw 120 further includes a cross member 200 that mounts to the jaw body 160 (or is integrally formed therewith) and extends laterally from the shearing blades 170, 180 to the guide blade 190. Together, the blades 170, 180, guide blade 190, and cross member 200 form or define a slot 210 into which the upper jaw 110 moves as it pivots to close the shears 100 during shearing operation of the shears 100.

As shown in FIGS. 1-4, the upper jaw 110 comprises a main jaw body 230. As shown in FIGS. 1-2, the upper jaw 110 also includes two shearing blades 240, 250 that detachably mount (e.g., via bolts, wedge blocks, etc.) to the jaw body 230 (either directly or by way of an intermediate blade holder (not shown)) or are integrally formed with the jaw body 230. The blades 240, 250 include shearing edges 240a, 250a that shearingly mate with the shearing edges 170a, 180a when the shears 100 closes.

Figure 4:
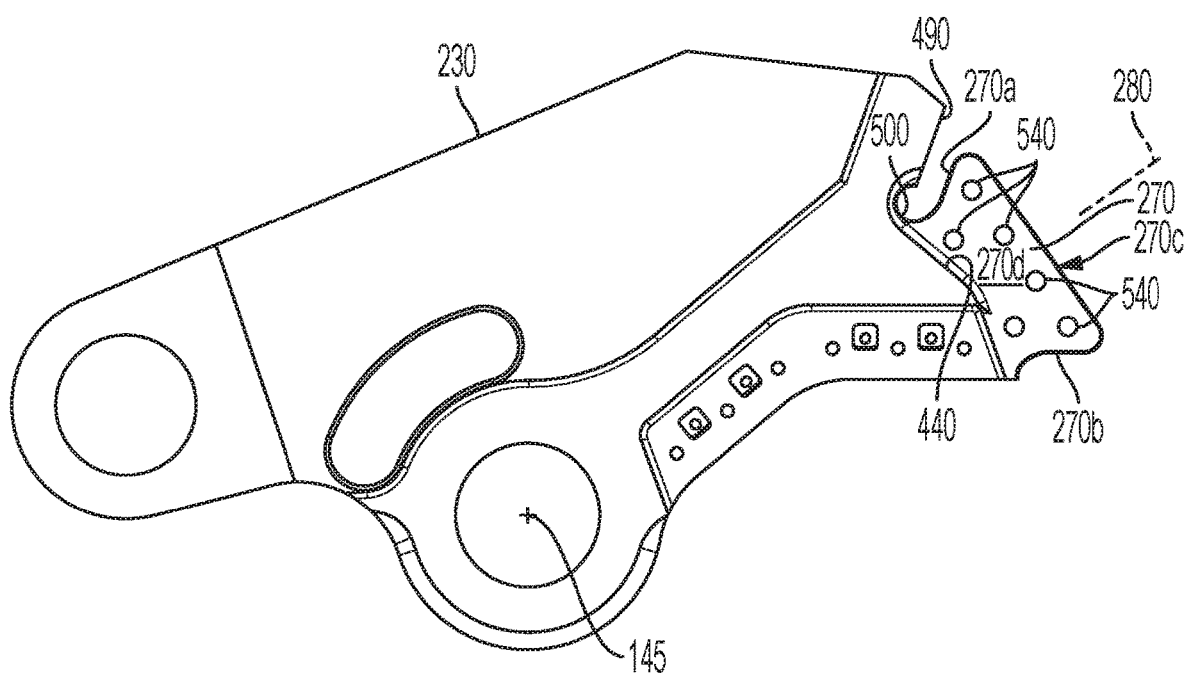
FIG. 4 is a side view of an upper jaw body of the upper jaw of FIG. 3.
Figure 10:
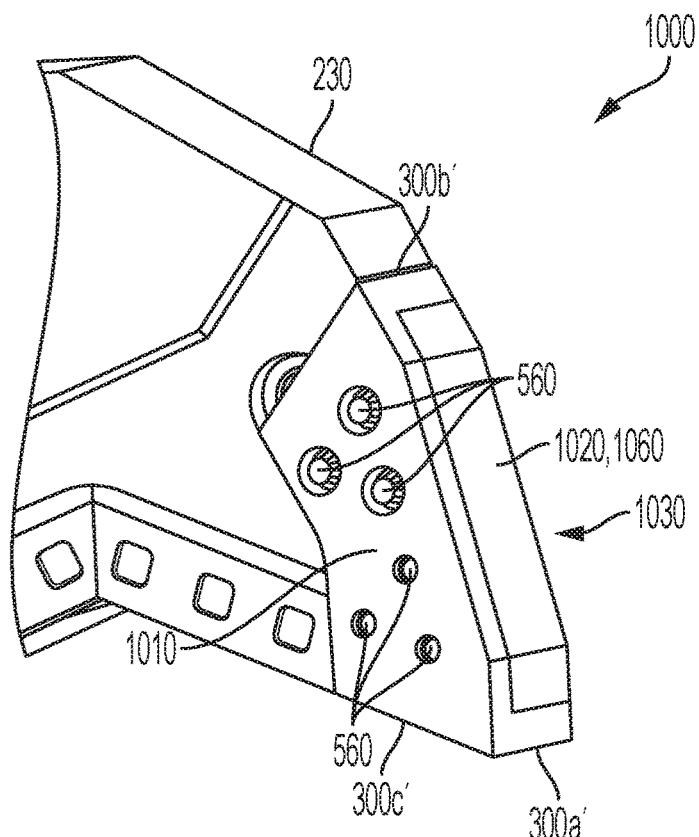
FIGS. 10 and 11 are partial front perspective views of a shears according to an alternative embodiment.
Figure 11:
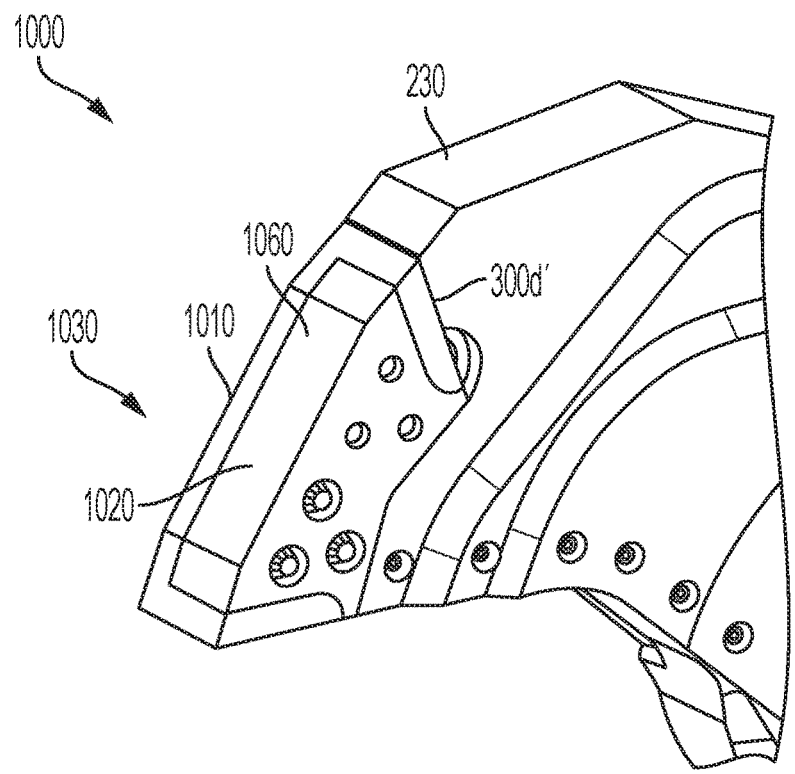
Figure 12:
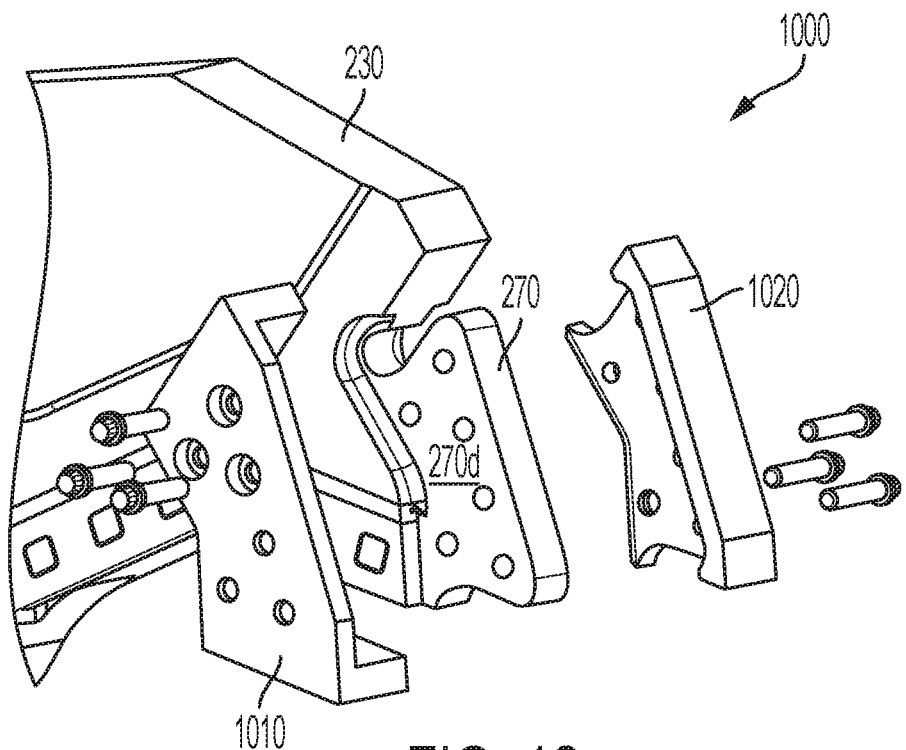
FIGS. 12 and 13 are partial, front/side, partially-exploded, perspective views of the shears of FIGS. 10 and 11.
Figure 13:
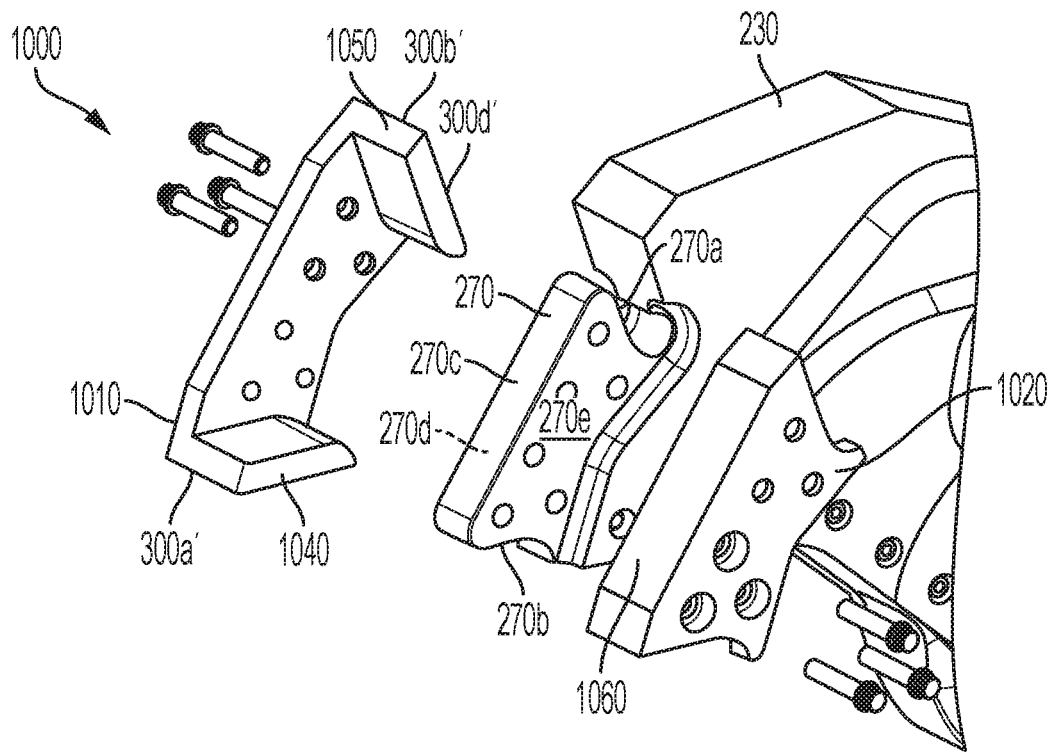
Figure 14:
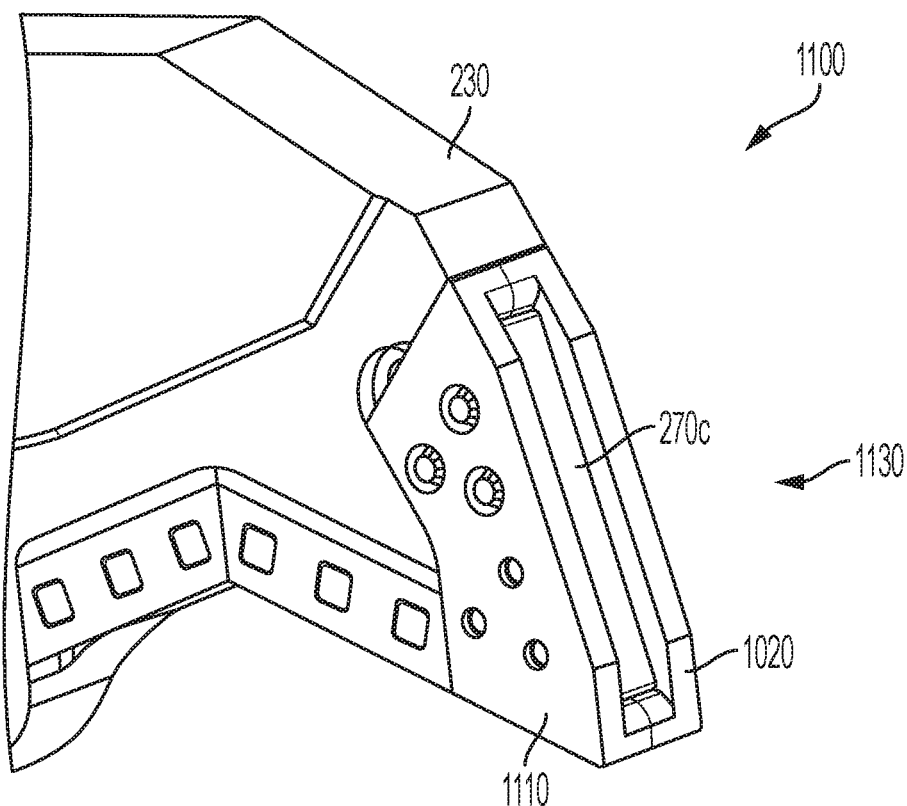
FIGS. 14 and 15 are partial, front/side, perspective views of a shears according to an alternative embodiment.
Figure 15:
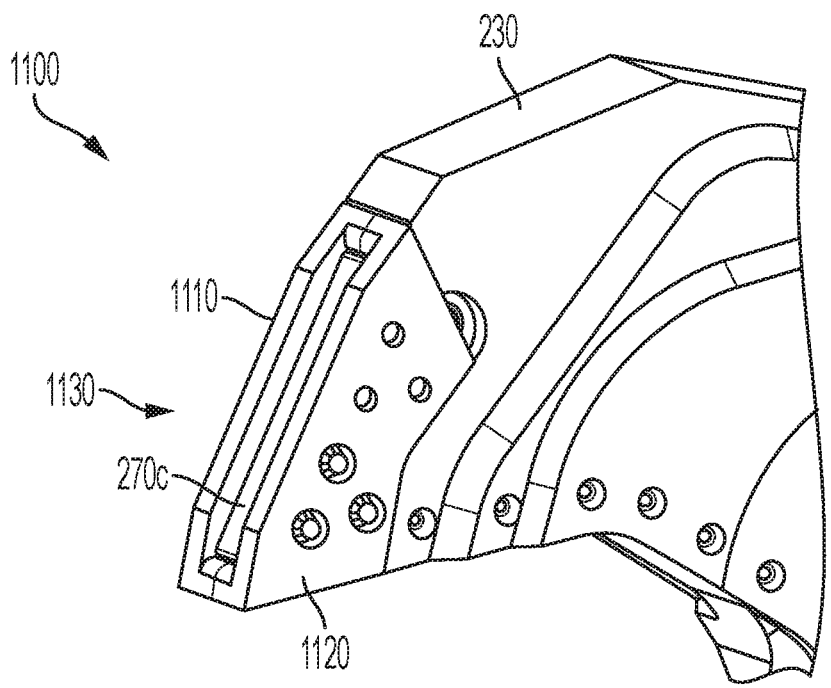
Figure 16:
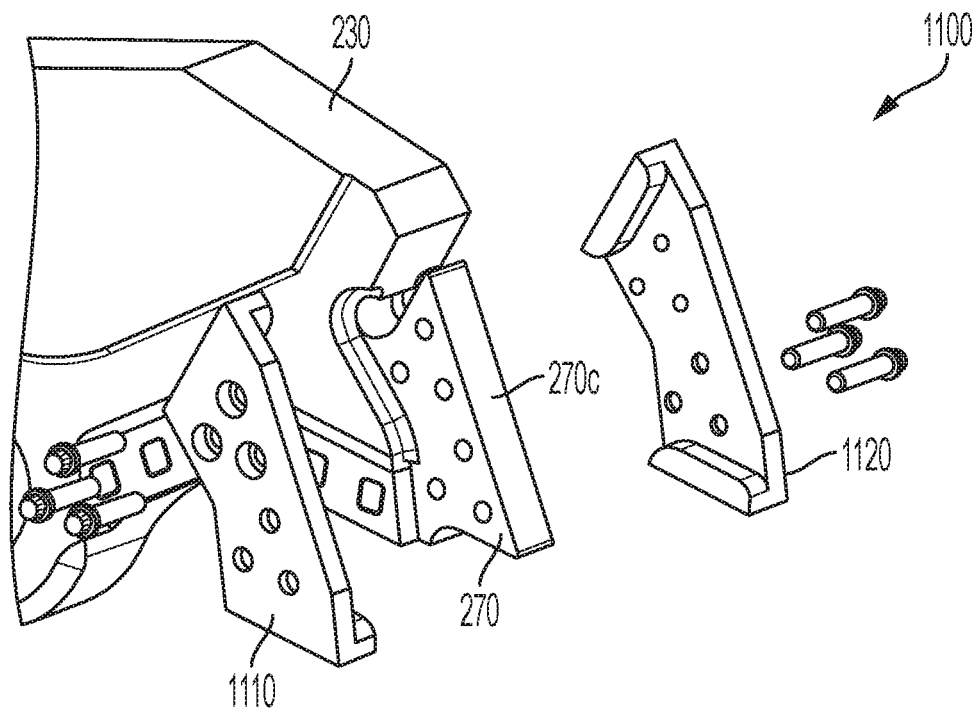
FIGS. 16 and 17 are partial, front/side, partially-exploded, perspective views of the shears of FIGS. 14 and 15.
Figure 17:
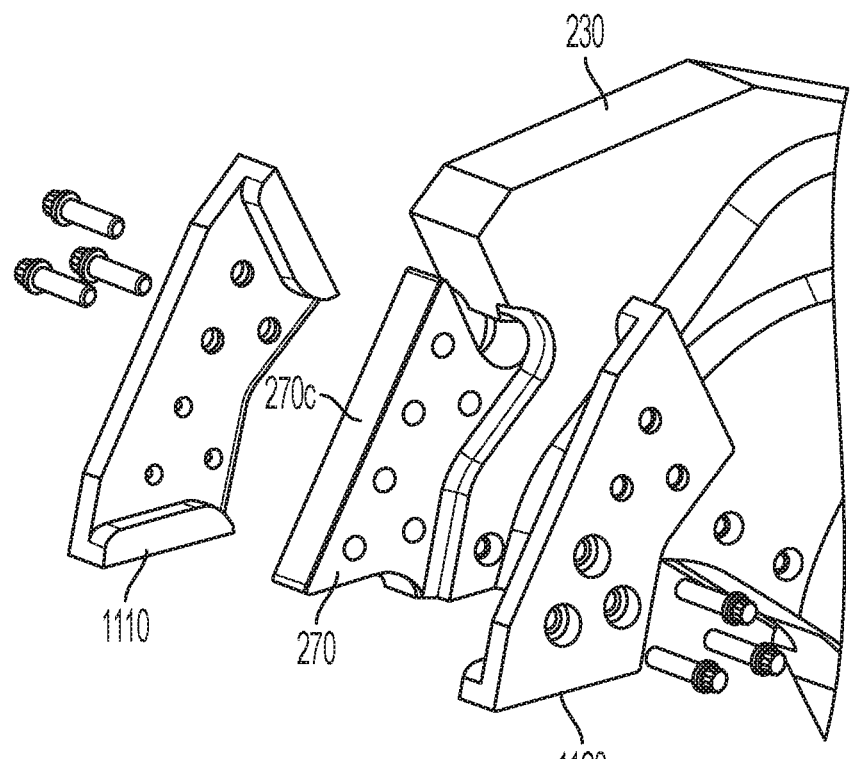
Figure 18:
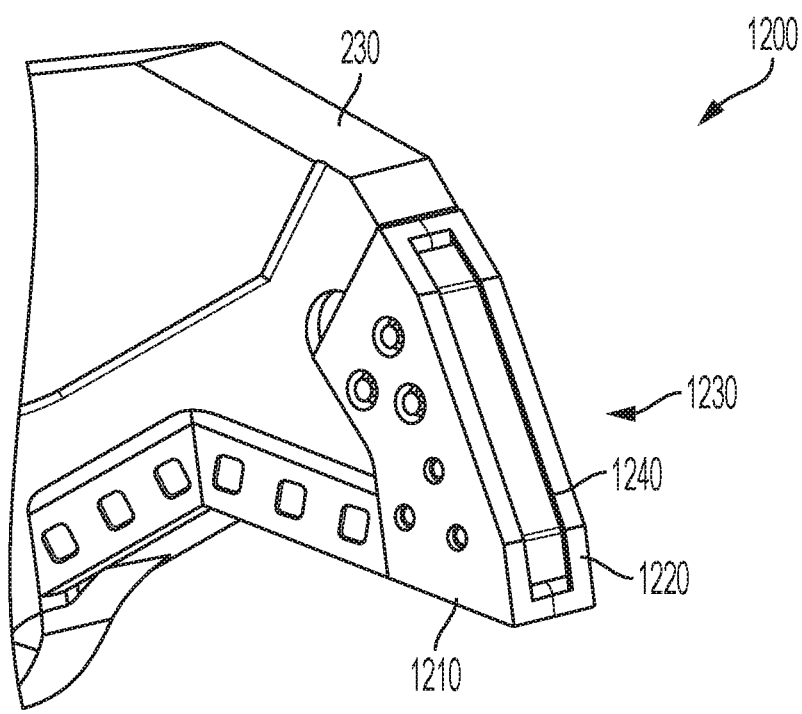
FIGS. 18 and 19 are partial, front/side, perspective views of a shears according to an alternative embodiment.
Figure 19:
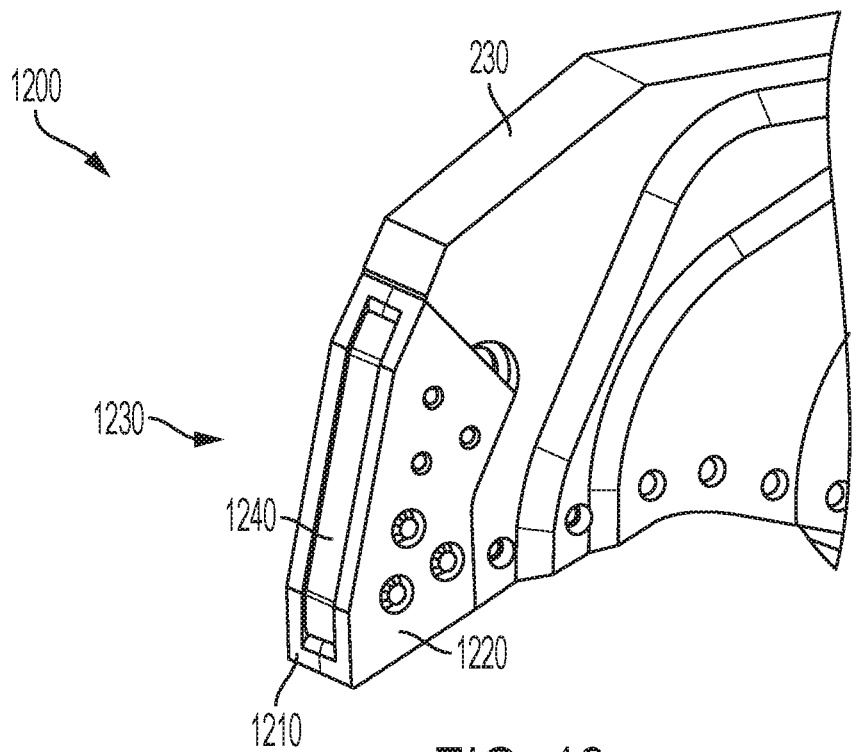
Figure 20:
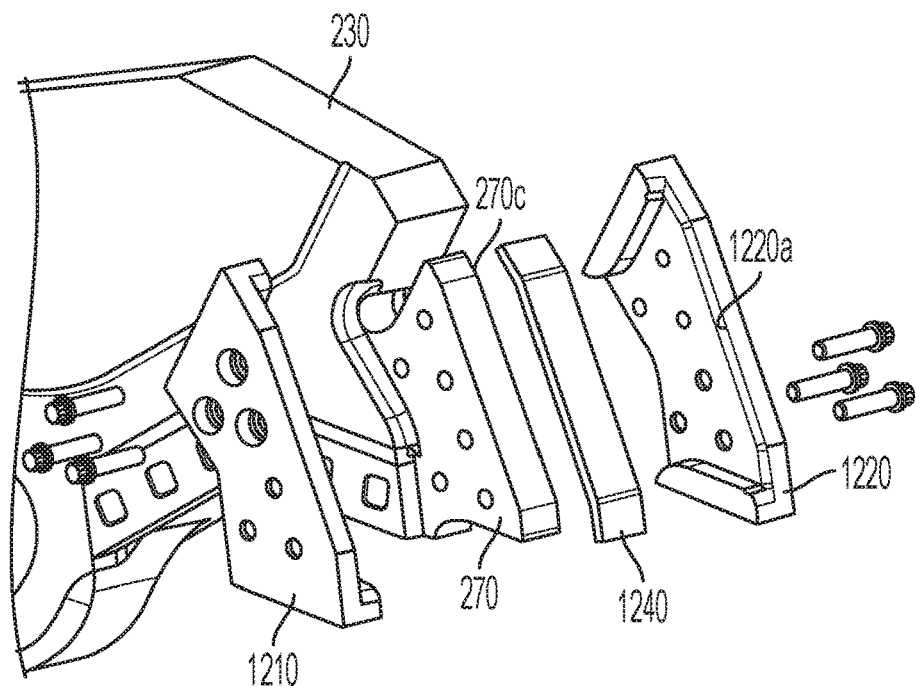
FIGS. 20 and 21 are partial, front, partially-exploded, perspective views of the shears of FIGS. 18 and 19.
Figure 21:
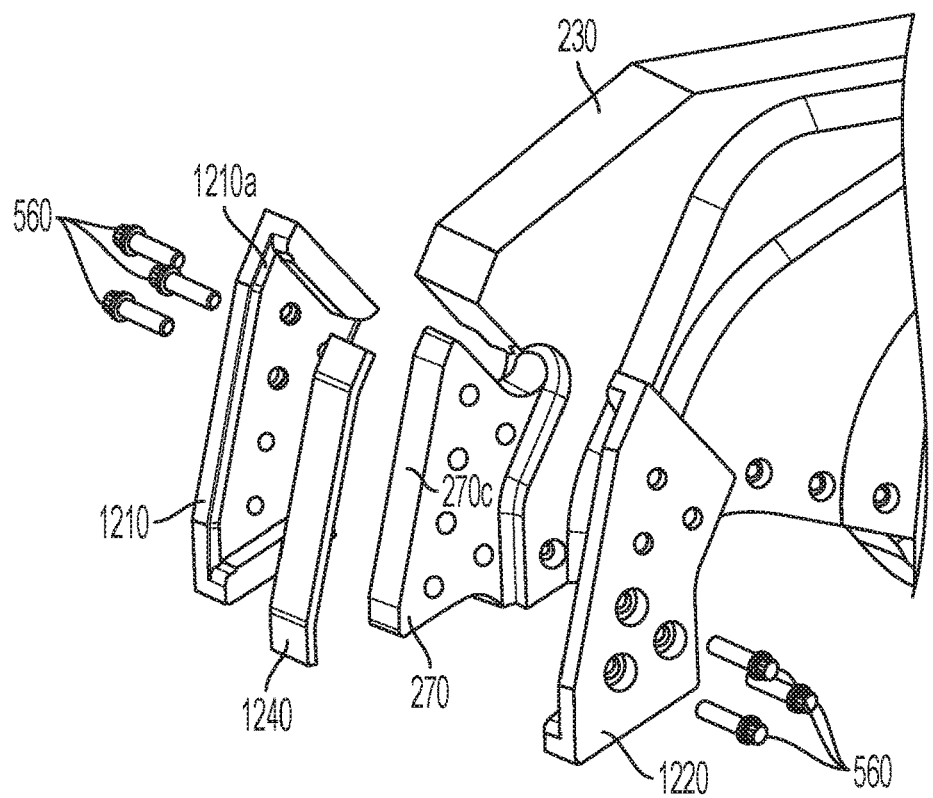

As shown in FIGS. 2 and 4, the upper jaw body 230 comprises a front nose portion 270 that projects forwardly from a remainder of the jaw body 230 and includes a top surface 270a, a bottom surface 270b, a front surface 270c, and two opposing side surfaces 270d, 270e. The nose portion 270 is laterally and vertically narrower than the portion of the upper jaw body 230 from which the nose portion 270 forwardly projects. The jaw body 230 includes forwardly facing transition surfaces 415 that form the transition between wider lateral sides of the jaw body 230 and the laterally inwardly disposed sides 270d, 270e of the nose portion 270. Similarly, the jaw body 230 includes a transition surface 490 between the upper portion of the jaw body 230 and the nose portion 270.

In the illustrated embodiment, the bottom and top surfaces 270a, 270b transition smoothly into the front surface 270c, but the transitions could alternatively be angular (e.g., like the angular transitions between the front surface 270c and the side surfaces 270d, 270e).

The top and bottom surfaces 270a, 270b are identically shaped, but could alternatively have different shapes. The nose portion 270 may be detachably mounted to the remainder of the jaw body 230 or be integrally formed with a remainder of the jaw body 230. For example, the nose portion 270 may be welded to a remainder of the jaw body 230. The nose portion 270 may be hollow or solid. As shown in FIG. 4, the nose portion 270 may be 180° rotationally symmetrical about a pivot axis 280 that is perpendicular to the axis 145 and a middle portion of the front surface 270c. As shown in FIG. 4, upper and lower halves of the nose portion 270 may be mirror images of each other relative to a plane that includes the axis 280 and is parallel to the axis 145. However, according to alternative embodiments, the nose portion 270 is not rotationally or mirror-image symmetrical.

Figure 3:
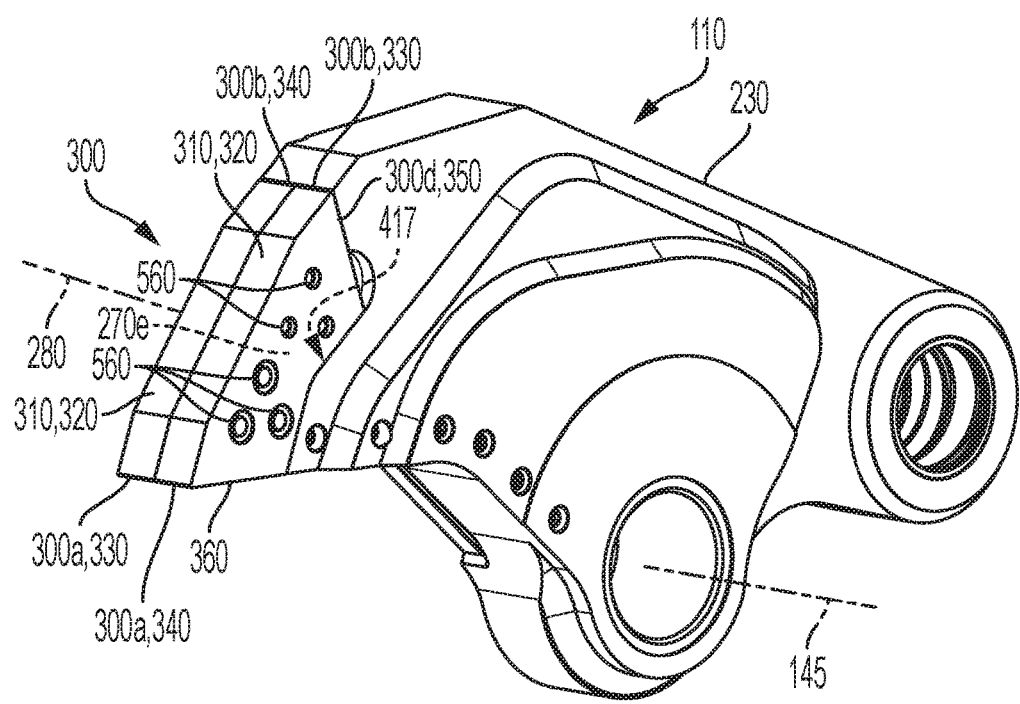
FIG. 3 is a front/side perspective view of an upper jaw of the shears of FIG. 1.

As shown in FIGS. 1-3, the upper jaw 110 includes an indexable piercing tip 300 that detachably mounts to the upper jaw 230 so as to enclose the top, bottom, front, and two opposing side surfaces 270a-e of the nose portion 270. The tip 300 therefore provides a full boot enclosure around the nose portion 270. The tip 300 provides a replaceable wear part that protects the nose portion 270 from wear and tear and has two usable sets of shearing and piercing edges.

The inner surfaces of the piercing tip 300 abut the top, bottom, front, and two opposing side surfaces 270a-e of the nose portion 270, either with or without contact. For example, the piercing tip 300 may contact both of the abutting side surfaces 270d, 270e, the bottom surface 270b, and the top surface 270a, while remaining spaced from the abutting front surface 270c.

According to various embodiments, inner surfaces of the piercing tip 300 seat against (i.e., contact) the top, bottom, front, and both opposing side surfaces 270a-e of the nose portion 270 when the piercing tip 300 is in the first or second operative positions.

In the illustrated embodiment, the piercing tip 300 fully encloses each of the top, bottom, front, and two opposing side surfaces 270a-e of the nose portion 270. However, according to various alternative embodiments, the piercing tip 300 may only partially enclose one or more of these surfaces 270a-e, while still protecting the surfaces 270a-e. For example, one or more of the walls 430, 440, 450 of one or both of the metal bodies 310, 320 may include cutouts, slots, holes, or other gaps through which one or more of the surfaces 270a-e are partially exposed. According to various embodiments, when the piercing tip 300 is in the first or second operative position, the piercing tip 300 encloses:

(1) more than 20, 30, 40, 50, 60, 70, 80, 90, and/or 95% of an area of the top surface 270a;
(2) more than 20, 30, 40, 50, 60, 70, 80, 90, and/or 95% of an area of the bottom surface 270b;
(3) more than 20, 30, 40, 50, 60, 70, 80, 90, and/or 95% of an area of the front surface 270c;
(4) more than 20, 30, 40, 50, 60, 70, 80, 90, and/or 95% of an area of the shearing-side side surface 270d; and/or
(5) more than 20, 30, 40, 50, 60, 70, 80, 90, and/or 95% of an area of the guide-side side surface 270e.

The piercing tip 300 can protect the various surfaces 270a-e of the nose portion 270 even in embodiments in which the piercing tip only partially encloses such surfaces 270a-e.

The indexable piercing tip 300 includes a first piercing edge 300a (see FIG. 3), a second piercing edge 300b (see FIG. 3), a first shearing edge 300c (see FIG. 1), and a second shearing edge 300d (see FIG. 3). The indexable piercing tip 300 is selectively attachable to the nose portion 270 in a first operative position (shown in FIGS. 1 and 3) in which (1) the first piercing edge 300a is exposed and presented for piercing use, (2) the first shearing edge 300c is presented for shearing use so as to shearingly mate with the shearing edge 180a when the shears 100 closes, and (3) the second piercing edge 300b and second shearing edge 300d are in a stowed/non-exposed position. When the exposed first piercing edge 300a and/or first shearing edge 300c become dull or worn, the piercing tip 300 may be indexed into a second operative position so as to instead present the second piercing edge 300b and second shearing edge 300d for use. In the second operative position of the piercing tip 300, (1) the second piercing edge 300b is exposed and presented for piercing use, (2) the second shearing edge 300d is presented for shearing use so as to shearingly mate with the shearing edge 180a when the shears 100 close, and (3) the first piercing edge 300a and first shearing edge 300c are in a stowed/non-exposed position. The indexable piercing tip 300 encloses and protects the top, bottom, front, and two opposing side surfaces 270a-e of the nose portion 270 when the piercing tip 300 is in the first or second operative position.

According to various embodiments, the second operative position of the piercing tip 300 is a position in which the indexable piercing tip 300 is rotated 180° relative to the first operative position, for example about the axis 280. As shown in FIG. 3, according to various embodiments, the piercing tip 300 is 180° rotationally symmetrical about the pivot axis 280.

According to various embodiments, the piercing tip 300 may additionally and/or alternatively be mirror-image symmetrical about a plane that includes the axis 280 and is parallel to the axis 145 (e.g., if the upper half of the metal bodies 310, 320 are mirror images of the lower half of the metal bodies 31, 320). According to various embodiments, the piercing tip 300 may additionally and/or alternatively be mirror-image symmetrical about a plane that includes the axis 280 and is perpendicular to the axis 145 (e.g., if the metal bodies 310, 320 are mirror images of each other). As the term "mirror-image symmetrical" is used herein, a structure (e.g., metal bodies 310, 320) is still mirror-image symmetrical even though the bolt mounting holes and or patterns within the structure are not mirror image symmetrical.

As shown in FIGS. 1-3, the indexable piercing tip 300 comprises first and second metal bodies 310, 320 that sandwich the nose portion 270 therebetween when the indexable piercing tip 300 is in the first operative position or the second operative position. Together, the bodies 310, 320 define a cavity 325 (see FIGS. 2, 5) into which the nose portion 270 fits. According to various embodiments, the metal bodies 310, 320 must be moved laterally toward each other so as to position the nose portion 270 within the cavity 325 formed between the metal bodies 310, 320. Thus, in some embodiments, the metal bodies 310, 320 must be laterally separated from each other to remove the piercing tip 300 from the nose portion 270. The piercing tip 300 may be switched between its first and second operative positions by switching the relative positions of the first and second metal bodies 310, 320, which includes rotating the metal bodies 180° about the axis 280 and switching each metal body 310, 320 to the other lateral side of the jaw 110.

In the illustrated shears 100, the first metal body 310 has the same shape as the second metal body 320 so that a single SKU/part number may be used for first metal body 310 and the second metal body 320. While it is envisioned that the metal bodies 310, 320 will be replaced at the same time (e.g., when both sets of piercing and shearing edges have become dull or worn), the metal bodies 310, 320 may alternatively be replaced one-at-a-time, in which case a single spare metal body may take the place of either of the metal bodies 310, 320.

As shown in FIGS. 5-9, each metal body 310, 320 has piercing edge portions 330, 340 disposed on opposite ends of the body 310, 320, a shearing edge 350, a guide-side edge 360, an outer lateral side surface 370, an inner lateral side surface 375, a recessed inner lateral side surface 378 (see FIGS. 5, 7), a rear surface 380, a front surface 390 (see FIG. 6), and intermediate surfaces 400, 410 that extend between the front surface 390 to the rear surface 380. As shown in FIGS. 6-8, the piercing edge portions 330, 340 are formed at the intersections of the front surface 390 with the intermediate surfaces 400, 410, respectively. As shown in FIGS. 8-9, the shearing edge 350 is formed at the intersection between the outer lateral side surface 370 and the intermediate surface 400. As shown in FIG. 6, the guide-side edge 360 is formed at the intersection between the outer lateral side surface 370 and the intermediate surface 410.

As shown in FIG. 3, when the piercing tip 300 is in the first operative position, the piercing edge portion 330 of one of the metal bodies 310, 320 and piercing edge portion 340 of the other of the metal bodies 310,320 combine to define the piercing edge 300a of the piercing tip 300. As shown in FIG. 3, the piercing edge 300a extends across an entire lateral width of the front nose of the upper jaw 110 for piercing use when the shears 100 closes. Similarly, when the piercing tip 300 is in the first operative position, the piercing edge 340 of the one of the metal bodies 310,320 and piercing edge portion 330 of the other of the metal bodies 310,320 combine to define the piercing edge 300b of the piercing tip 300. When the piercing tip 300 is in the second operative position, the piercing edge 300b extends across an entire lateral width of the front nose of the upper jaw 110 for piercing use when the shears 100 closes.

When the piercing tip 300 is in the first operative position, the shearing edge 350 of one of the metal bodies 310, 320 defines the shearing edge 300c of the piercing tip 300. When the piercing tip 300 is in the second operative position, the shearing edge 350 of the other of the metal bodies 310, 320 defines the shearing edge 300c of the piercing tip 300. The shearing edge 300c shearingly mates with the shearing edge 180a of the lower jaw 130 as the shears 100 close.

As shown in FIGS. 1 and 9, the rear surface 380 of each metal body 310, 320 includes a planar portion 380a. As shown in FIG. 1, when the piercing tip 300 is in the first operative position, the planar portion 380a of the one of the metal bodies 310,320 faces a planar end of the upper blade 250. Similarly, when the piercing tip 300 is in the second operative position, the planar portion 380a of the other of the metal bodies 310,320 faces the planar end of the upper blade 250. In the illustrated embodiment, a gap is formed between the planar portion 380a and the front planar end of the upper blade 250 (e.g., to accommodate tolerances), such that the piercing tip 300 does not contact the upper blade 250 when mounted to the upper jaw 230 in the first or second operative positions. However, according to alternative embodiments, the piercing tip 300 contacts the upper blade 250 so as to transfer stress/force from the piercing tip 300 to the upper jaw body 230 via the upper blade 250.

As shown in FIGS. 5 and 9, the rear surface 380 curves rearwardly as it progresses away from the portion 380a. According to various alternative embodiments, the planar portion 380a is omitted, and the entire rear surface 380 is curved. According to various embodiments, as shown in FIGS. 2-4, the rear surfaces 380 of the metal bodies 310, 320 contact correspondingly shaped, forward-facing seating surfaces 415, 417 of the upper jaw body 230. Relief recesses may be formed at the intersections between the surfaces 415, 417 and the side surfaces 270d, 270e, respectively, of the nose portion 270 to as to reduce stress build-up at those intersections.

According to alternative embodiments, the rear surfaces 380 of the metal bodies 310, 320 do not contact the surfaces 415, 417 or any other part of the main jaw body 230.

As shown in FIGS. 3 and 5-9, the front surface 390 of each metal body 310, 320 is formed by three planar portions that meet each other at angles. However according to alternative embodiments, the front surface 390 may comprise curved portions.

As shown in FIG. 5, the surface 375 projects laterally inwardly from the recessed surface 378 so as to define (1) top/bottom walls 430, 440 that projects laterally inwardly from the surface 375, and (2) a front wall 450 that projects laterally inwardly from the surface 375. The walls 430, 440, 450 define inner surfaces 460, 470, 480 that face (e.g., with or without contact) and enclose portions of the top, bottom, and front surfaces 270a, 270b, 270c of the nose portion 270 when the metal bodies 310, 320 are positioned in the first or second operative positions.

The surfaces 378, 460, 470, 480 of the metal bodies 310, 320 combine to define the cavity 325 formed by the piercing tip 300. The cavity 325 may have the shape of the nose portion 270 so that the nose portion 270 fits tightly within the cavity 325 when the piercing tip 300 is in the first or second operative position. Like the piercing tip 300, the cavity 325 may be 180° rotationally symmetrical about the axis 280 (shown in FIG. 3).

When the piercing tip 300 is in the first operative position (shown in FIGS. 2-3), the surface 470 of the first piercing tip 300 and the surface 460 of the second piercing tip 320 rest on the top surface 270a of the nose portion 270. This contact helps to discourage the piercing tip 300 from separating downwardly from the jaw body 230 when the shears 100 are opening (e.g., when material wedges the piercing tip 300 between the blades 180, 190 of the lower jaw 120 such that friction impedes the ability of the piercing tip 300 to be moved upwardly with the upper jaw body 230 to open the shears 100). Similarly, when the piercing tip 300 is in the second operative position, the surface 460 of the first piercing tip 300 and the surface 470 of the second piercing tip 320 rest on the top surface 270a of the nose portion 270 to help to keep the piercing tip 300 firmly attached to the upper jaw body 230 during pullout/opening of the shears 100. This contact between the piercing tip 300 and the top surface 270a of the nose portion 270 may reduce the size and/or number of fasteners (e.g., bolts 560) needed to secure the piercing tip 300 to the upper jaw 230.

As shown in FIGS. 2 and 4, the upper jaw body 230 has a surface 490 that faces the top of the piercing tip 300 when the piercing tip 300 is mounted to the jaw body 230. A relief recess 500 or cutout may be formed at the intersection between the upper surface 270a of the nose portion 270 and the surface 490 of the upper jaw body 230 so as to reduce stresses within the upper jaw body 230 during pullout/opening of the shears 100. According to various embodiments, the surface 490 does not contact the piercing tip 300 when the piercing tip 300 is in its first or second operative position. Rather, a gap is formed between the piercing tip 300 and the surface 490 of the upper jaw body 230. However, according to alternative embodiments, the piercing tip 300 may contact the surface 490 so as to transfer piercing/shearing forces from the piercing tip 300 to the upper jaw body 230 via the surface 490.

As shown in FIG. 3, the front walls 450 of the metal bodies 310, 320 together define a front wall of the piercing tip 300 that encloses and faces the front surface 270c of the nose portion 270. Similarly, when the piercing tip 300 is in the first operative position, the wall 430 of the first metal body 310 and the wall 440 of the second metal body 320 together define a bottom wall of the piercing tip 300 and together enclose and face the bottom surface 270b of the nose portion 270. Conversely, when the piercing tip 300 is in the second operative position, the wall 440 of the first metal body 310 and the wall 430 of the second metal body 320 together define a bottom wall of the piercing tip 300 and together enclose and face the bottom surface 270b of the nose portion 270.

When the piercing tip 300 is in the first operative position, the inner surface 378 of one of the metal bodies 310, 320 faces and encloses the side surface 270d, while the inner surface 378 of the other of the metal bodies 310, 320 faces and encloses the side surface 270e. Conversely, when the piercing tip 300 is in the second operative position, the inner surface 378 of the other of the metal bodies 310, 320 faces and encloses the side surface 270d, while the inner surface 378 of the one of the metal bodies 310, 320 faces and encloses the side surface 270e.

As shown in FIGS. 5-6 and 9, each metal body 310, 320 includes a plurality of laterally-extending, through-holes 520 that extend from the surface 370 to the surface 378 and include recessed-shoulders to accommodate bolt heads. The metal bodies 310, 320 also include a plurality of threaded, laterally-extending, through-holes 530 that extend from the surface 370 to the surface 378. As shown in FIG. 4, the nose portion 270 includes a set of laterally-extending through holes 540. When the piercing tip 300 is in the first or second operative position, each hole 520 in one of the metal bodies 310, 320 is coaxially aligned with a respective hole 540 in the nose portion 270 and a respective threaded hole 530 in the other of the metal bodies 310, 320 so that a respective bolt 560 (see FIGS. 2-3) extends through the holes 520, 540 and threads into the threaded hole 530 so as to secure the metal bodies 310, 320 to the nose portion 270.

Figure 29:
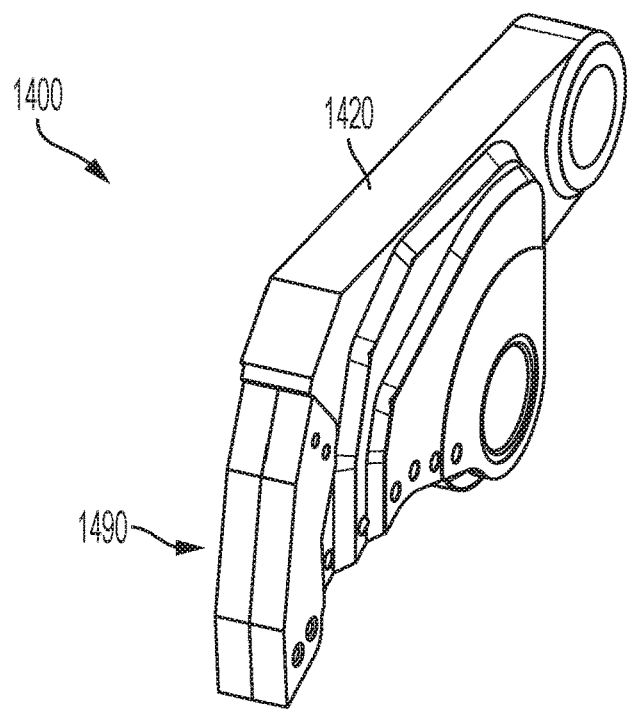
FIG. 29 is a partial, front/side, perspective view of a shears according to an alternative embodiment.
Figure 30:
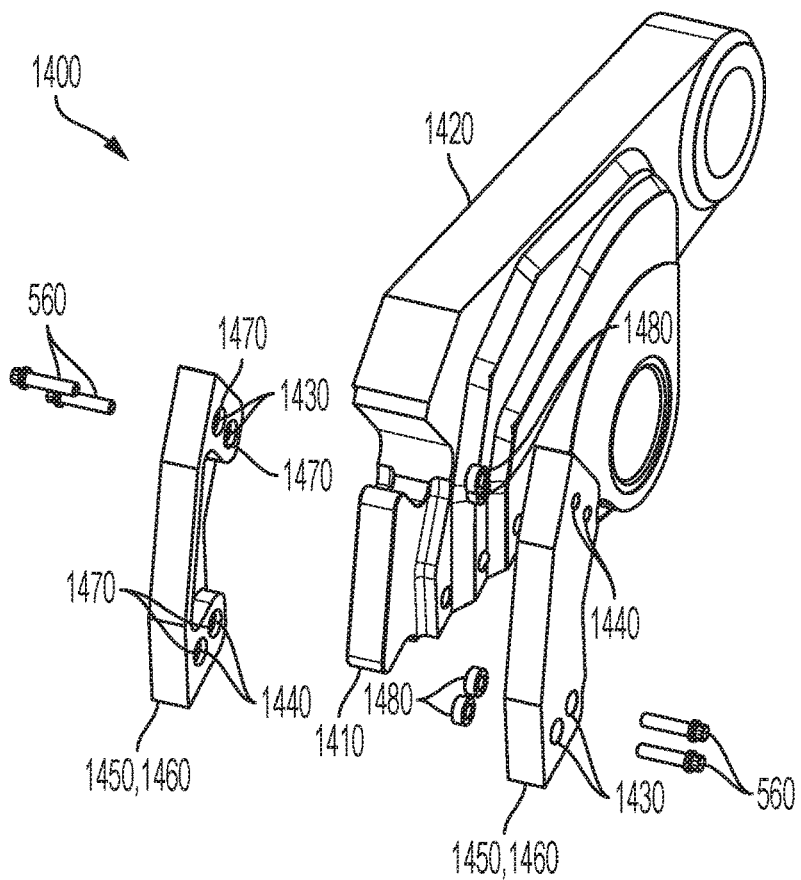
FIG. 30 is a partial, front/side, partially-exploded, perspective view of the shears of FIG. 29.
Figure 31:
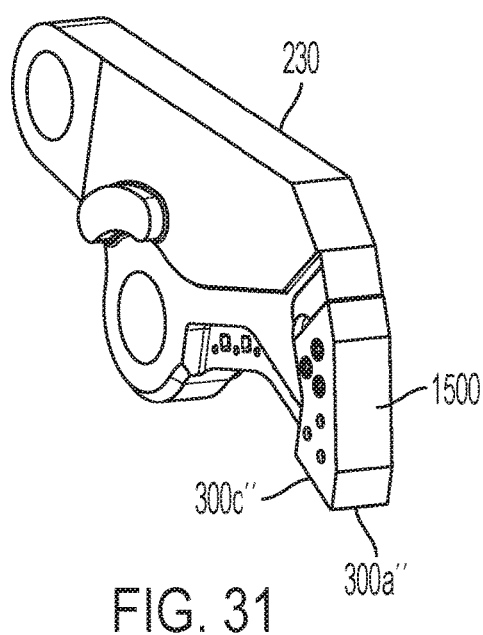
FIGS. 31 and 32 are partial, front/side, perspective views of a shears according to an alternative embodiment.
Figure 32:
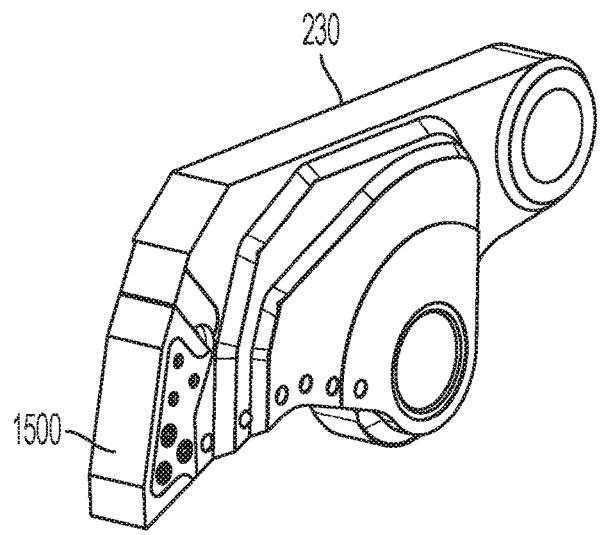
Figure 33:
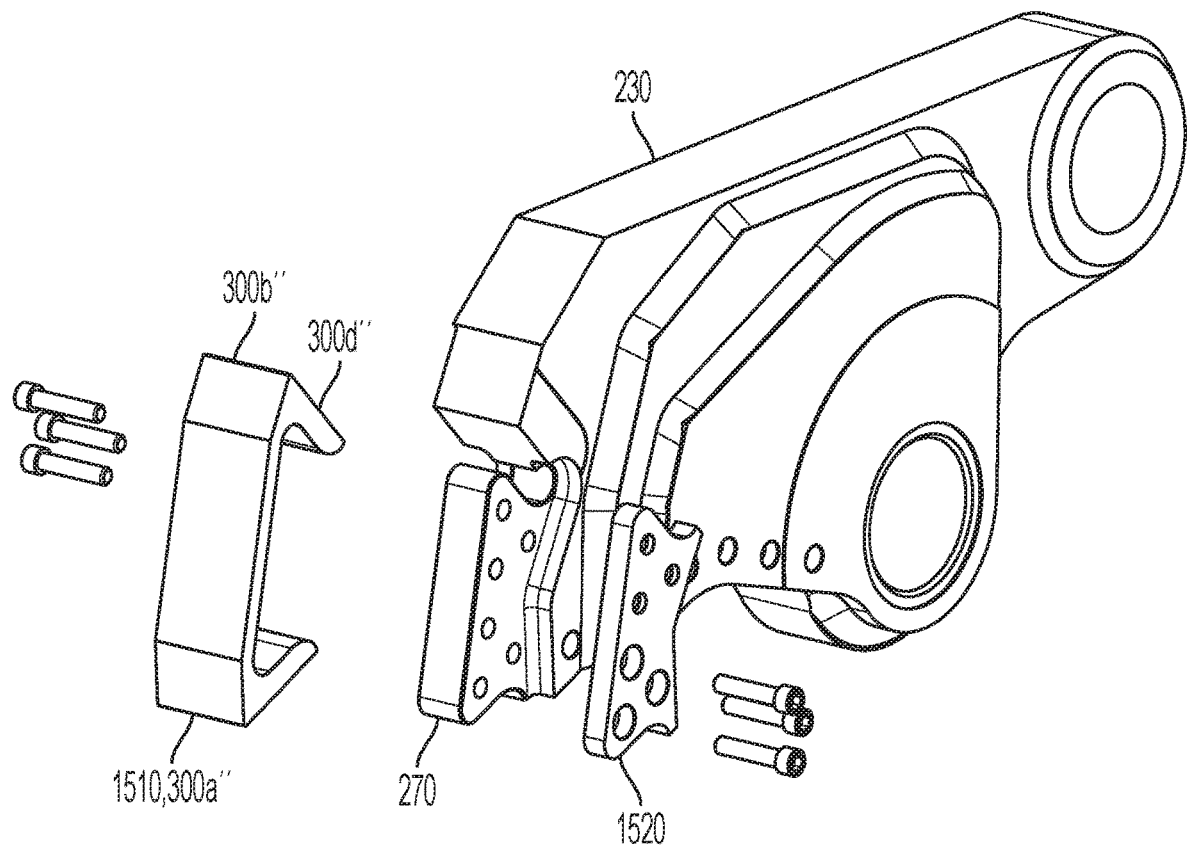
FIG. 33 is a partial, front/side, partially-exploded, perspective view of the shears of FIGS. 31 and 32.
Figure 34:
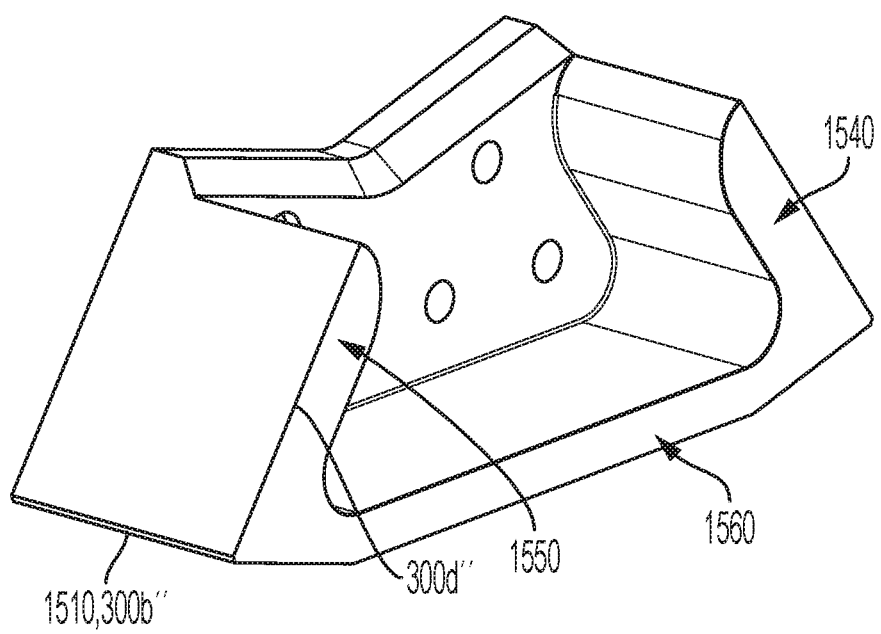
FIG. 34 is a perspective view of a metal body of a piercing tip of the shears of FIGS. 31 and 32.

In the illustrated embodiment, the bolts 560 extend through holes in the nose portion 270 of the upper jaw body 230. However, according to alternative embodiments, the holes 520, 530 may be positioned so as to avoid the nose portion 270 (e.g., as shown in FIGS. 29-30). For example, the holes 520, 530 may extend from the surface 370 to the surface 375 via one or more of the walls 430, 440, 450. In such alternative embodiments, the metal bodies 310, 320 mount directly to each other, and sandwich the nose portion 270 therebetween without having the bolts 560 pass through the nose portion 270.

In the illustrated shears 100, the threaded holes 530 are through holes. However, according to alternative embodiments, the threaded holes 530 may be blind holes that do not extend the entire way to the surface 370.

To index the piercing tip 300 (for example, when the exposed shearing edge 300c and/or piercing edge 300a become dull or worn), the bolts 560 are removed, the relative positions of the first and second metal bodies 310, 320 are switched, and the bolts 560 are reattached, thus exposing the piercing edge 300b and shearing edge 300d for use.

While bolts 560 are used to secure the piercing tip 300 to the upper jaw body 230 of the shears 100, the bolts 560 may be replaced with any other suitable fastener(s) (e.g., wedge blocks) without deviating from the scope of the present invention.

In the illustrated embodiment, the bolts 560 thread into threaded holes in the metal bodies 310, 320. Alternatively, the threaded holes 530 may be replaced with recessed-shoulder through holes like the holes 520, in which case nuts and bolts may be used to secure the piercing tip to the nose portion. The recessed shoulder ensures that the nuts and bolts remain in a recessed position relative to the outer lateral sides of the piercing tip so as not to interfere with the shearing/sliding motion of the piercing tip relative to the mating blades 180, 190 of the lower jaw 130.

According to various alternative embodiments, the nose portion 270 includes threaded holes and the metal bodies bolt directly to the nose portion 270, rather than to each other. In such embodiments, one metal body 310, 320 may be removed and replaced without removing the other metal body 310, 320 from the nose portion 270.

FIGS. 10-13 illustrate an alternative shears 1000 that are identical to the shears 100, except that the first and second metal bodies 1010, 1020 of the piercing tip 1030 of the shears 1000 are differently shaped than the metal bodies 310, 320 of the piercing tip 300 of the shears 100. Accordingly, a redundant description of like features and structures is omitted. Together, the metal bodies 1010, 1020 have the same or substantially the same shape as the metal bodies 310, 320, so the piercing tip 1030 can be indexed in the same manner as the piercing tip 300. Unlike the metal bodies 310, 320 of the piercing tip 300, the metal bodies 1010, 1020 of the piercing tip 1030 are not identically shaped. Rather, with reference to FIG. 10, the first metal body 1010 defines the piercing tip 1030's:

i) entire first piercing edge 300a′,
 ii) entire second piercing edge 300b′,
 iii) entire first shearing edge 300c′,
 iv) entire second shearing edge 300d′, and
 v) entire top/bottom walls 1040, 1050 that enclose and face the top and bottom surfaces 270a, 270b, respectively, of the nose portion 270.

Conversely, the second metal body 1020 defines the entire portion of the front wall 1060 that faces and encloses the front surface 270c of the nose portion 270.

FIGS. 14-17 illustrate an alternative shears 1100 that are identical to the shears 100, except that the first and second metal bodies 1110, 1120 of the piercing tip 1130 of the shears 1100 are differently shaped than the metal bodies 310, 320 of the piercing tip 300 of the shears 100. Accordingly, a redundant description of like features and structures is omitted. Together, the metal bodies 1110, 1120 have the same or substantially the same shape as the metal bodies 310, 320, so the piercing tip 1130 can be indexed in the same manner as the piercing tip 300, except that the metal bodies 1110, 1120 lack the front wall 450 that is present in the metal bodies 310, 320. Accordingly, in the shears 1100, the front surface 270c of the nose portion 270 is exposed and not enclosed by the piercing tip 1130.

FIGS. 18-21 illustrate an alternative shears 1200 that are similar to the shears 100, except that the piercing tip 1230 of the shears 1200 includes three metal bodies 1210, 1220, 1240, rather than the two metal bodies 310, 320 of the piercing tip 300. The first and second metal bodies 1210, 1220 are similar to the first and second metal bodies 310, 320, except that the first and second metal bodies 1210, 1220 lack the front wall 450 of the bodies 310, 320, and instead include grooves 1210a, 1220a that correspond to the shape of the lateral edges of the third metal body 1240.

To attach the piercing tip 1230 to the upper jaw body 230, the first and second jaw bodies are moved laterally toward the sides of the nose portion 270 while the third body 1240 is held in place in front of the front surface 270c of the nose portion 270 so that the lateral edges of the third metal body 1240 engage the grooves 1210a, 1220a. The bolts 560 are then inserted and tightened, which secures the first and second metal bodies 1210, 1220 in place, and sandwiches the third metal body 1240 therebetween so as to hold the third metal body 1240 in place so as to protect and enclose the front surface 270c of the nose portion 270.

Figure 22:
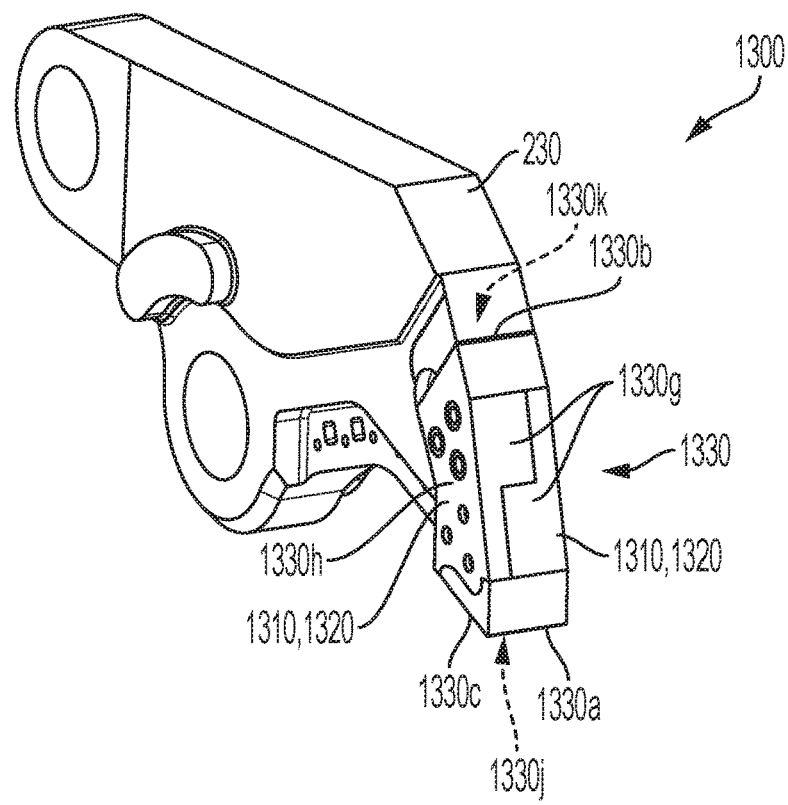
FIG. 22 is a partial, front/side, perspective view of a shears according to an alternative embodiment.
Figure 23:
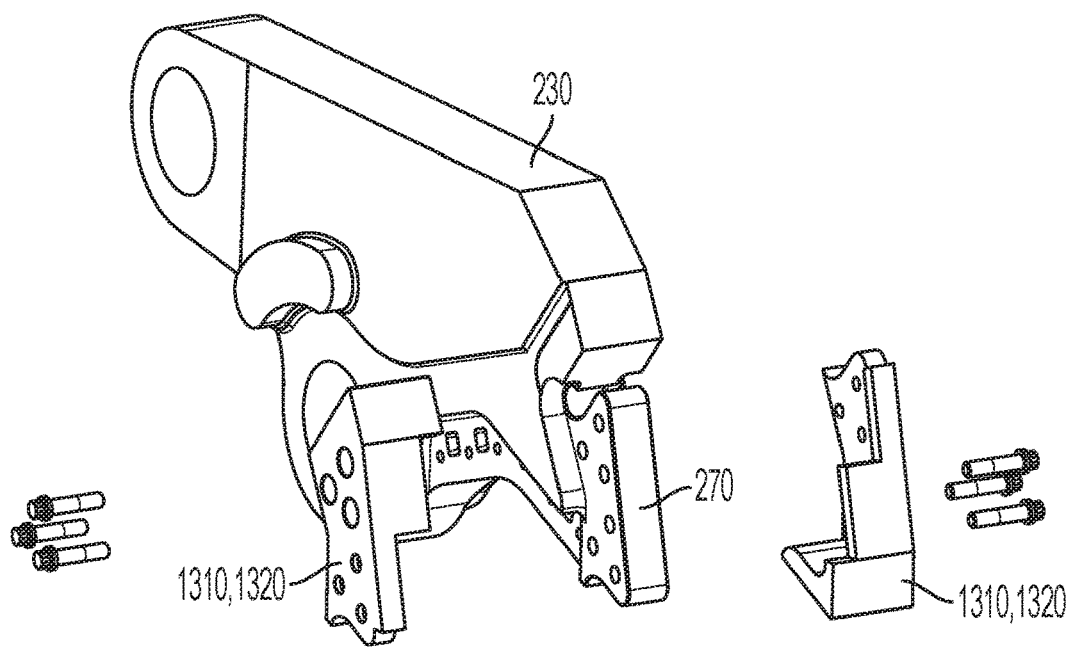
FIGS. 23 and 24 are partial, front/side, partially-exploded, perspective views of the shears of FIG. 22.
Figure 24:
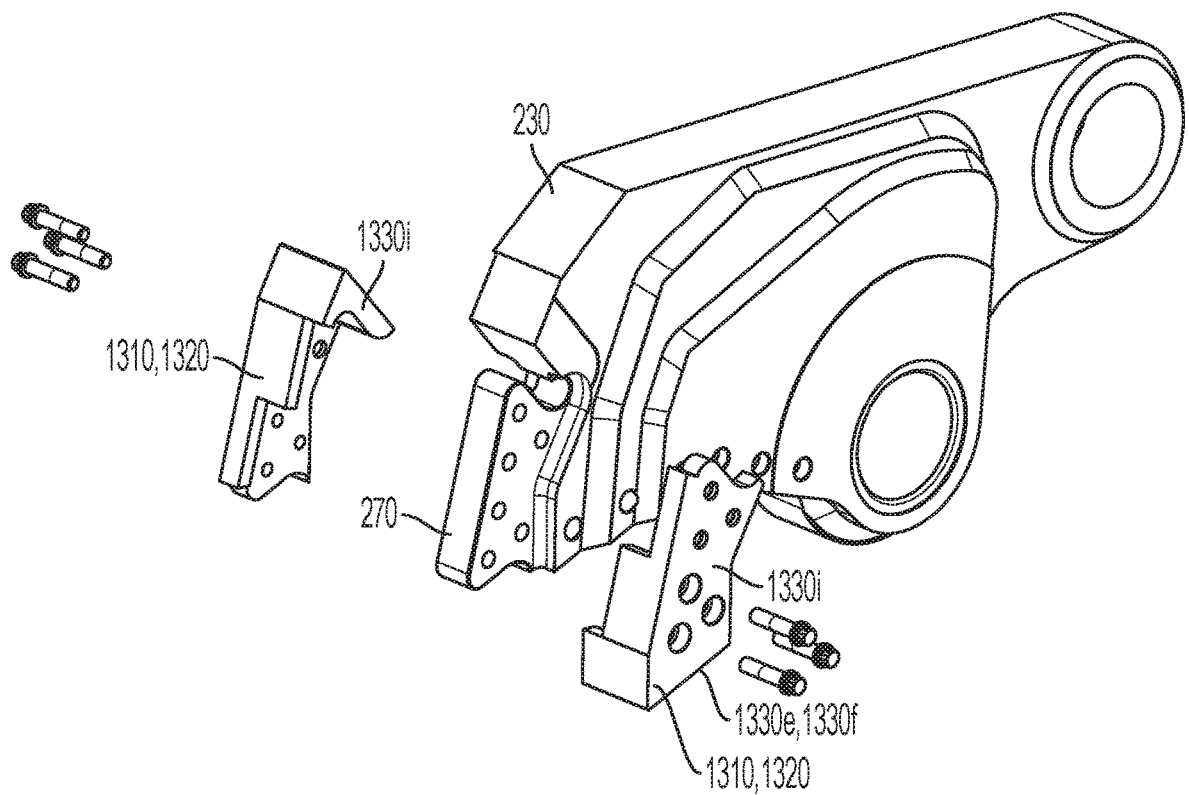
Figure 25:
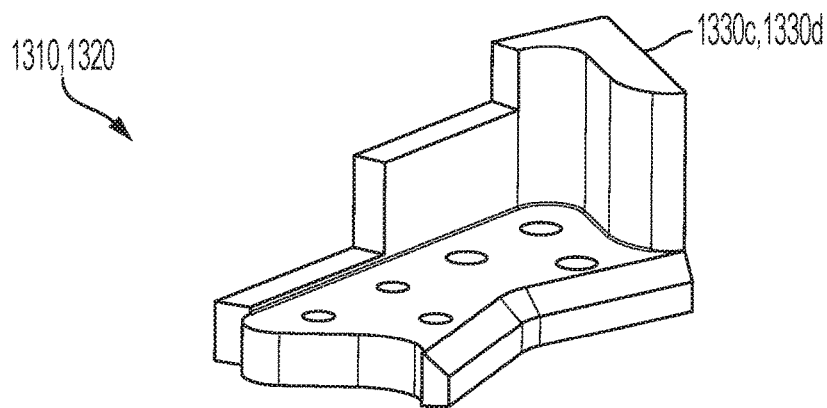
FIG. 25 is a perspective view of a metal body of a piercing tip of the shears of FIG. 22.
Figure 28:
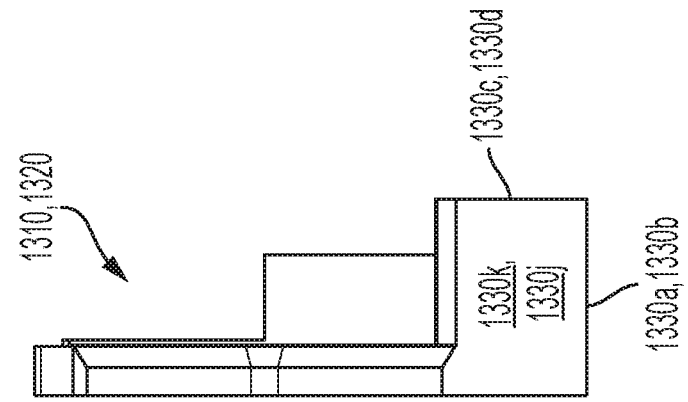
FIG. 28 is rear view of the metal body of FIG. 25.
Figure 27:
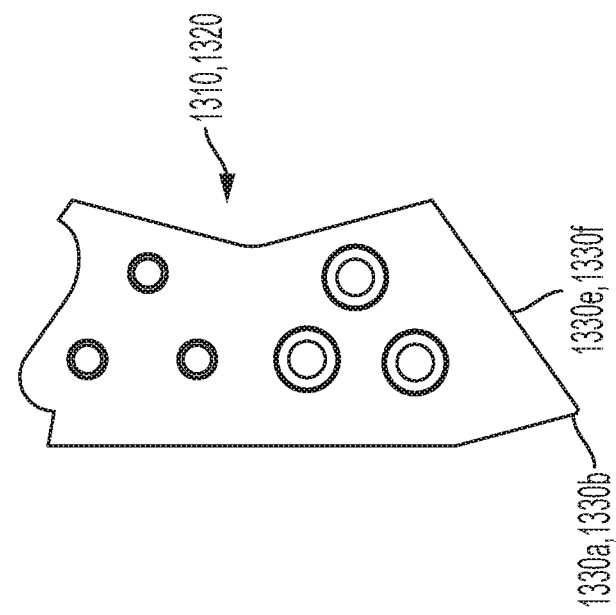
FIG. 27 is an outer side view of the metal body of FIG. 25.
Figure 26:
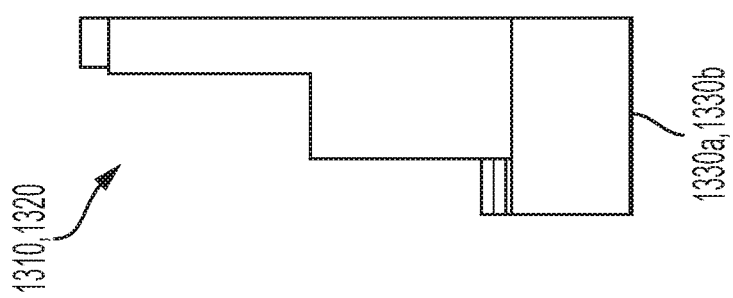
FIG. 26 is a front view of the metal body of FIG. 25.

FIGS. 22-28 illustrate an alternative shears 1300 that are identical to the shears 100, except that the first and second metal bodies 1310, 1320 of the piercing tip 1330 of the shears 1300 are differently shaped than the metal bodies 310, 320 of the piercing tip 300 of the shears 100. Accordingly, a redundant description of like features and structures is omitted. Together, the metal bodies 1310, 1320 have the same or substantially the same shape as the metal bodies 310, 320, so the piercing tip 1330 can be indexed in the same manner as the piercing tip 300. Like the metal bodies 310, 320, the metal bodies 1310, 1320 are identically shaped. However, the metal bodies 1310, 1320 form different portions of the piercing tip 1330 than the metal bodies 310, 320 form of the of the piercing tip 300. As shown in FIG. 22, each of the metal bodies 1310, 1320 forms an entire one of the piercing edges 1330a, 1330b, an entire one of the shearing edges 1330c, 1330d, and an entire one of the guide-side edges 1330e, 1330f of the piercing tip 1330. As shown in FIG. 22, the metal bodies 1310, 1320 each form a portion of a front surface 1330g of the piercing tip 1330. As shown in FIG. 22, the metal bodies 1310, 1320 each form a portion of each outer lateral side surface 1330h, 1330i of the piercing tip 1330. As shown in FIGS. 2228, each metal body 1310, 1320 forms an entire one of the top/bottom surfaces 1330j, 1330k of the piercing tip 1330.

FIGS. 29-30 illustrate an alternative upper jaw 1400 that may be used in the shears 100 in place of the upper jaw 110. The upper jaw 1400 is similar to the upper jaw 110. Accordingly, a redundant description of like features and structures is omitted. The upper jaw 1400 differs from the upper jaw 110 predominantly in that the bolts 560 of the jaw 1400 do not pass through the nose portion 1410 of the upper jaw body 1420 of the upper jaw 1400. Rather, the recessed-shoulder through holes 1430 and threaded holes 1440 of the first and second metal bodies 1450, 1460 are positioned more distally on the metal bodies 1450, 1460 so as to not coaxially align with the nose portion 1410 (or any other portion of the upper jaw body 1420). As shown in FIG. 30, inner lateral ends of the holes 1430, 1440 may include recessed shoulders/enlarged diameter portions 1470 that accommodate bosses/bushings 1480. The bolts 560 extend through the bosses/bushings 1480 when the piercing tip 1490 mounts to the upper jaw body 1420 in the first or second operative positions. The bosses/bushings 1480 help to securely attach the metal bodies 1450, 1460 to each other and discourage one of the bodies 1450, 1460 from moving relative to the other body 1450, 1460 (e.g., along a potential sliding plane formed along a planar intersection between the bodies 1450, 1460).

While such bosses/bushings are illustrated with respect to the jaw 1400, it should be understood that similar bosses, bushings, or dowels may be used in any other embodiment to help secure the first and second metal bodies to each other or to the nose portion. Additionally and/or alternatively, the mating faces of any of the metal body sets described herein may have mating surface features (e.g., protrusion(s) on one metal body that mate with recesses in the other metal body) that discourage relative movement between the metal bodies when the metal bodies are attached to each other.

FIGS. 31-34 illustrate an alternative piercing tip 1500 that may be used in the shears 100 in place of the piercing tip 300. The piercing tip 1500 is identical to the piercing tip 300, except that the first and second metal bodies 1510, 1520 of the piercing tip 1500 of the shears 1000 are differently shaped than the metal bodies 310, 320 of the piercing tip 300. Accordingly, a redundant description of like features and structures is omitted. Together, the metal bodies 1510, 1520 have the same or substantially the same shape as the metal bodies 310, 320, so the piercing tip 1500 can be indexed in the same manner as the piercing tip 300. Unlike the metal bodies 310, 320 of the piercing tip 300, the metal bodies 1510, 1520 of the piercing tip 1500 are not identically shaped. Rather, the first metal body 1510 defines the piercing tip 1500's:
  i) entire first piercing edge 300a" (See FIGS. 31, 33),
  ii) entire second piercing edge 300b" (see FIGS. 33-34),
  iii) entire first shearing edge 300c" (see FIG. 31),
  iv) entire second shearing edge 300d" (See FIG. 34),
  v) entire top/bottom walls 1540, 1550 that enclose and face the top and bottom surfaces 270a, 270b, respectively, of the nose portion 270 (see FIG. 34), and
  vi) the entire front wall 1560 that encloses and faces the front surface 270c of the nose portion 270.

Conversely, the second metal body 1520 encloses and faces one of the lateral sides 270e of the nose portion when the piercing tip 1500 is in the first operative position, and the other lateral side 270d when the piercing tip 1500 is in the second operative position.

Figure 35:
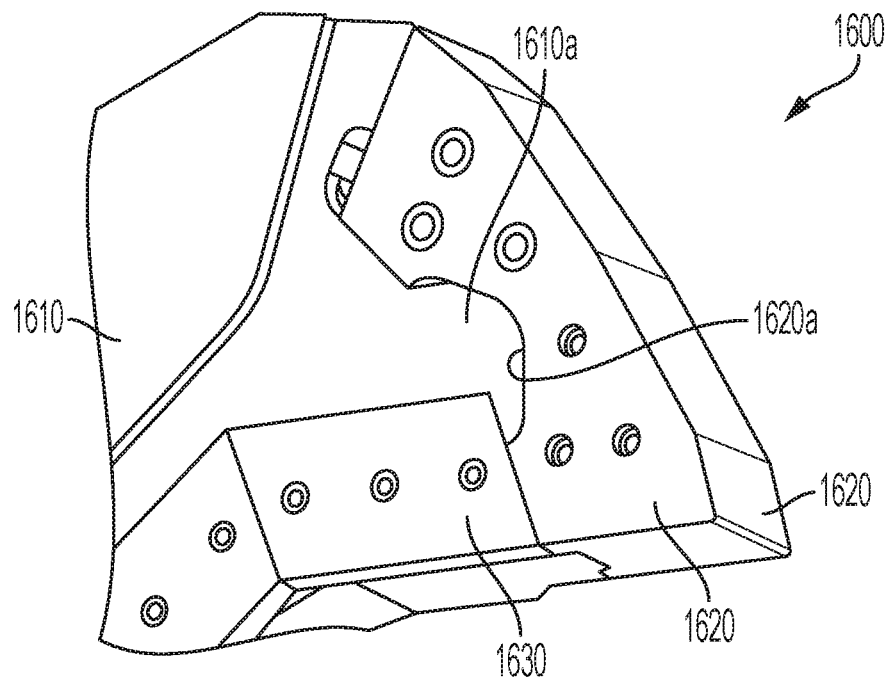
FIG. 35 is a partial, front/side, perspective view of a shears according to an alternative embodiment.
Figures 36, 37:
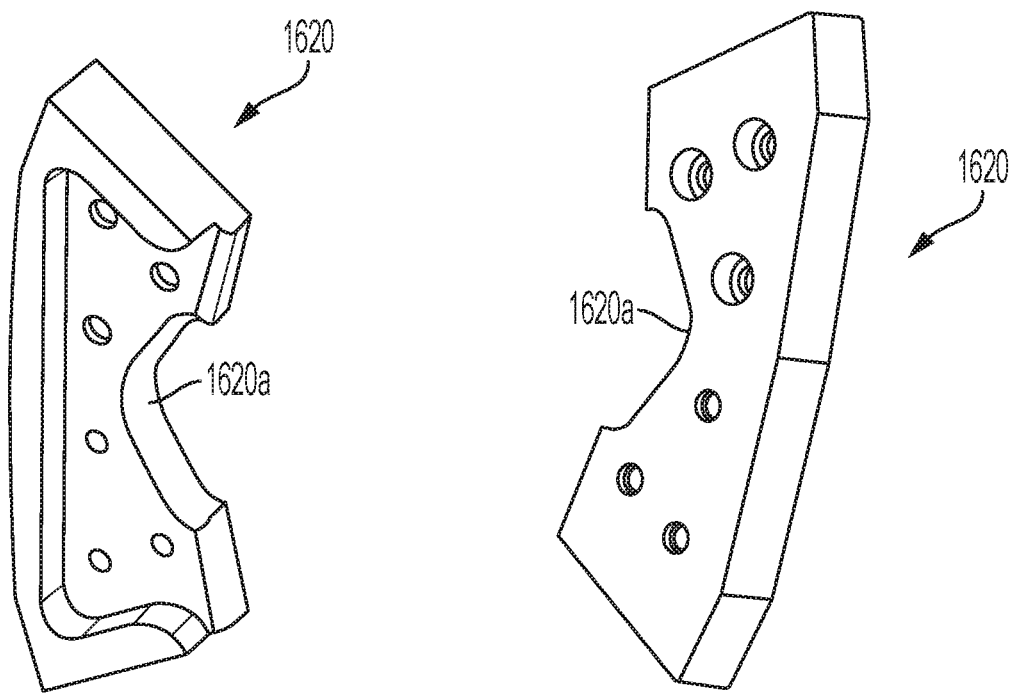
FIGS. 36 and 37 are perspective views of a metal body of a piercing tip of the shears of FIG. 35.

FIGS. 35-37 illustrate a shears 1600 according to an alternative embodiment. Except as explained herein, the shears 1600 are identical to (or substantially similar to) the shears 100, so a redundant description of the common features and structures is omitted. The shears 1600 differ from the shears 100 in that lateral side portions 1610a of the upper jaw 1610 of the shears 1600 project forwardly farther than in the shears 100. Only the right lateral side portion 1610a is shown in FIG. 35 because the left lateral side portion 1610a is identical (i.e., a lateral mirror image of the right lateral side portion 1610a). Conversely, the metal bodies 1620 of the piercing tip of the shears 1600 differ from the metal bodies 310,320 of the shears 100 because the metal bodies 1620 include enlarged notches 1620a on their rearward, central portions. These notches 1620a accommodate and closely mimic the surface of the lateral side portions 1610a of the upper jaw 1610. According to various non-limiting embodiments, the provision of the lateral side portions 1610a strengthens a nose portion of the upper jaw 1610, which may improve the jaw's ability to absorb the forces transferred to the upper jaw 1610 from the blade 1630 and/or the metal bodies 1620 of the piercing tip. The particular shapes and sizes of the notches 1620a and lateral side portions 1610a may be selected to improve the ability of the upper jaw 1610 to absorb the forces transferred to it from the blades 1620, 1630 during use of the shears 1600. According to various embodiments, the forward surface of the lateral side portion 1610a and rearward surface of the notches 1620a are complimentary, slightly spaced from each, and/or comprise one or more linear/planar portions, one or more curved portions, and/or a combination of linear and curved portions.

In the illustrated embodiments, the first and second bodies of the illustrated piercing tips comprise metal bodies. However, according to alternative embodiments, the first and second bodies may additionally and/or alternatively comprise other materials (e.g., composite materials).

The foregoing illustrated embodiments are provided to illustrate the structural and functional principles of various embodiments and are not intended to be limiting. To the contrary, the principles of the present invention are intended to encompass any and all changes, alterations and/or substitutions thereof (e.g., any alterations within the spirit and scope of the following claims).

What is claimed is:

1. A demolition shears, comprising:
   a first jaw;
   a second jaw pivotally connected to the first jaw for pivotal movement relative to the first jaw about a jaw axis, the second jaw comprising:
      a jaw body with a nose portion, the nose portion having top, bottom, front, and two opposing side surfaces, wherein the front surface abuts the top surface and the bottom surface, wherein the top surface faces away from a bottom most edge of the nose portion, wherein the front surface is the frontmost surface on the jaw body, and wherein the bottom surface faces toward the first jaw, and
      an indexable piercing tip comprising first and second piercing edges and first and second shearing edges, the indexable piercing tip being selectively attachable to the nose portion in: (1) a first operative position in which the first piercing edge is presented for piercing use and the first shearing edge is presented for shearing use, or (2) a second operative position in which the second piercing edge is presented for piercing use and the second shearing edge is presented for shearing use,
   wherein, when the indexable piercing tip is in the first or second operative positions, the indexable piercing tip encloses a majority of the top surface, a majority of the bottom surface, a majority of the front surface, and a majority of at least one of the two opposing side surfaces, wherein the second operative position is a position in which the indexable piercing tip is rotated 180° relative to the first operative position,
   wherein the indexable piercing tip comprises a first body and a second body that sandwich the nose portion therebetween when the indexable piercing tip is in the first or second operative position.

2. The shears of claim 1, wherein the first body has the same shape as the second body.

3. The shears of claim 1, wherein the relative positions of the first and second bodies may be switched to switch the indexable piercing tip from the first operative position to the second operative position.

4. The shears of claim 1, wherein:
   the first body defines a portion of the first piercing edge and a portion of the second piercing edge; and
   the second body defines a portion of the first piercing edge and a portion of the second piercing edge.

5. The shears of claim 4, wherein:
   the first body defines the first shearing edge; and
   the second body defines the second shearing edge.

6. The shears of claim 4, wherein:
   the first body comprises a front wall that encloses a portion of the front surface of the nose portion when the indexable piercing tip is in either of the first and second operative positions; and
   the second body comprises a front wall that encloses a portion of the front surface of the nose portion when the indexable piercing tip is in either of the first and second operative positions.

7. The shears of claim 4, wherein:
   the first body defines a portion of the first piercing edge and defines a portion of the second piercing edge;
   the second body defines a portion of the first piercing edge and defines a portion of the second piercing edge;
   when the indexable piercing tip is in the first operative position, a surface of the first body and a surface of the second body face the bottom surface of the nose portion; and
   when the indexable piercing tip is in the second operative position, a surface of the first body and a surface of the second body face the bottom surface of the nose portion.

8. The demolition shears of claim 7, wherein:
   the first body comprises a first wall that faces and encloses a portion of the bottom surface of the nose portion when the piercing tip is in the first operative position,
   the first wall of the first body faces and encloses a portion of the top surface of the nose portion when the piercing tip is in the second operative position,
   the second body comprises a first wall that faces and encloses a portion of the bottom surface of the nose portion when the piercing tip is in the first operative position,
   the first wall of the second body faces and encloses a portion of the top surface of the nose portion when the piercing tip is in the second operative position,
   the first body comprises a second wall that faces and encloses a portion of the top surface of the nose portion when the piercing tip is in the first operative position,
   the second wall of the first body faces and encloses a portion of the bottom surface of the nose portion when the piercing tip is in the second operative position,
   the second body comprises a second wall that faces and encloses a portion of the top surface of the nose portion when the piercing tip is in the first operative position, and
   the second wall of the second body faces and encloses a portion of the bottom surface of the nose portion when the piercing tip is in the second operative position.

9. The shears of claim 1, wherein:
the first body defines the entire first piercing edge; and
the second body defines the entire second piercing edge.

10. The shears of claim 1, wherein the first body defines the entire first piercing edge, the entire second piercing edge, the entire first shearing edge, and the entire second shearing edge.

11. The shears of claim 10, wherein the second body encloses the entire front surface.

12. The shears of claim 1, wherein:
when the indexable piercing tip is in the first operative position, the first body faces and encloses a first of the two opposing side surfaces and the second body faces and encloses a second of the two opposing side surfaces; and
when the indexable piercing tip is in the second operative position, the first body buts and encloses the second of the two opposing side surfaces and the second body faces and encloses the first of the two opposing side surfaces.

13. The shears of claim 1, wherein:
the first body includes a threaded hole and a non-threaded through hole;
second body includes a threaded hole and a non-threaded through hole;
the threaded hole of the first body is co-axial with the non-threaded through hole of the second body when the indexable piercing tip is in the first or second operative positions;
the threaded hole of the second body is co-axial with the non-threaded through hole of the first body when the indexable piercing tip is in the first or second operative positions;
the shears further comprise a first bolt that extends through the non-threaded through hole of the first body and threads into the threaded hole of the second body; and
the shears further comprise a second bolt that extends through the non-threaded through hole of the second body and threads into the threaded hole of the first body.

14. The shears of claim 13, wherein:
the nose portion comprises laterally-extending through holes; and
the first and second bolts extend through respective ones of the laterally-extending through holes of the nose portion.

15. The shears of claim 14, wherein:
the nose portion includes first and second through holes;
when the indexable piercing tip is in the first operative position, (1) the first through hole of the nose portion is co-axial with the threaded hole of the first body and non-threaded hole of the second body, and (2) the second through hole of the nose portion is co-axial with the threaded hole of the second body and non-threaded hole of the first body; and
when the indexable piercing tip is in the second operative position, (1) the second through hole of the nose portion is co-axial with the threaded hole of the first body and non-threaded hole of the second body, and (2) the first through hole of the nose portion is co-axial with the threaded hole of the second body and non-threaded hole of the first body.

16. The shears of claim 1, further comprising:
an actuator operatively extending between the first and second jaws to cause the first and second jaws to selectively open and close; and
a mount shaped and configured to attach the shears to a boom of machinery.

17. The shears of claim 1, wherein:
the nose portion is 180° rotationally symmetrical about a nose portion axis that is perpendicular to the jaw axis.

18. The shears of claim 1, wherein, when the indexable piercing tip is in the first or second operative positions, the indexable piercing tip encloses at least 80% of each of the top, bottom, front, and at least one of the two opposing side surfaces.

19. The shears of claim 1, wherein, when the indexable piercing tip is in the first or second operative positions, the indexable piercing tip seats against each of the top, bottom, front, and two opposing side surfaces.

20. An indexable piercing tip shaped and configured to be attached to a nose portion of a jaw of a demolition shears, wherein:
the indexable piercing tip comprises a first body and a second body;
the indexable piercing tip forms first and second piercing edges and first and second shearing edges;
the indexable piercing tip is shaped and configured to be selectively attachable to the nose portion in: (1) a first operative position in which the first piercing edge is presented for piercing use, and the first shearing edge is presented for shearing use, or (2) a second operative position in which the second piercing edge is presented for piercing use and the second shearing edge is presented for shearing use;
the first and second bodies are shaped and configured to sandwich the nose portion therebetween when the indexable piercing tip is in the first or second operative position;
the indexable piercing tip is shaped and configured such that when the indexable piercing tip is in the first or second operative positions, the indexable piercing tip encloses a majority of a top surface of the nose portion, a majority of a bottom surface of the nose portion, a majority of a front surface of the nose portion, and a majority at least one of two opposing side surfaces of the nose portion, wherein the front surface abuts the top surface and the bottom surface, wherein the top surface faces away from a bottom most edge of the nose portion, and wherein the bottom surface faces toward the first jaw; and
the second operative position is a position in which the indexable piercing tip is rotated 180° relative to the first operative position,
wherein the piercing tip defines a cavity, wherein the cavity is shaped and sized such that the entire nose portion can be disposed within the cavity.

21. The indexable piercing tip of claim 20, wherein the first body has the same shape as the second body.

22. The demolition shears of claim 1, wherein:
the front surface is a distal portion of the nose portion remote from the jaw pivot axis; and
the first and second bodies, when coupled to each other to sandwich the nose portion therebetween, enclose, thereby to protect, the front surface, and substantially enclose, thereby to protect, the nose portion.

23. The demolition shears of claim 1, wherein the second operative position is a position in which the indexable piercing tip is rotated 180° about an indexing axis relative to the first operative position, wherein the indexing axis is perpendicular to and intersects the jaw axis.

24. A demolition shears comprising:
a first jaw;
a second jaw pivotally connected to the first jaw for pivotal movement relative to the first jaw about a jaw axis, the second jaw comprising:
  a jaw body with a nose portion, the nose portion having top, bottom, front, and two opposing side surfaces, wherein the front surface abuts the top surface and the bottom surface, wherein the top surface faces away from a bottom most edge of the nose portion, and wherein the bottom surface faces toward the first jaw, and
  an indexable piercing tip comprising first and second piercing edges and first and second shearing edges, the indexable piercing tip being selectively attachable to the nose portion in: (1) a first operative position in which the first piercing edge is presented for piercing use and the first shearing edge is presented for shearing use, or (2) a second operative position in which the second piercing edge is presented for piercing use and the second shearing edge is presented for shearing use,
wherein, when the indexable piercing tip is in the first or second operative positions, the indexable piercing tip encloses a majority of the top surface, a majority of the bottom surface, a majority of the front surface, and a majority of at least one of the two opposing side surfaces, wherein the second operative position is a position in which the indexable piercing tip is rotated 180° relative to the first operative position,
wherein the indexable piercing tip comprises a first body and a second body that sandwich the nose portion therebetween when the indexable piercing tip is in the first or second operative position,
wherein the piercing tip defines a cavity,
wherein the entire nose portion is disposed within the cavity.

25. The demolition shears of claim 1, wherein:
the piercing tip defines a cavity,
the nose portion is at least partially disposed within the cavity,
the cavity has an opening, and
the jaw body extends into the cavity only by way of the opening.

26. The indexable piercing tip of claim 20, wherein:
the cavity has an opening, and
the opening is shaped and sized such that when the piercing tip is attached to the nose portion, the jaw body extends into the cavity only by way of the opening.

27. A demolition shears comprising:
a first jaw;
a second jaw pivotally connected to the first jaw for pivotal movement relative to the first jaw about a jaw axis, the second jaw comprising:
  a jaw body with a nose portion, the nose portion having top, bottom, front, and two opposing side surfaces, wherein the front surface abuts the top surface and the bottom surface, wherein the top surface faces away from a bottom most edge of the nose portion, and wherein the bottom surface faces toward the first jaw, and
  an indexable piercing tip comprising first and second piercing edges and first and second shearing edges, the indexable piercing tip being selectively attachable to the nose portion in: (1) a first operative position in which the first piercing edge is presented for piercing use and the first shearing edge is presented for shearing use, or (2) a second operative position in which the second piercing edge is presented for piercing use and the second shearing edge is presented for shearing use,
wherein, when the indexable piercing tip is in the first or second operative positions, the indexable piercing tip encloses a majority of the top surface, a majority of the bottom surface, a majority of the front surface, and a majority of at least one of the two opposing side surfaces, wherein the second operative position is a position in which the indexable piercing tip is rotated 180° relative to the first operative position,
wherein the indexable piercing tip comprises a first body and a second body that sandwich the nose portion therebetween when the indexable piercing tip is in the first or second operative position,
wherein the top surface abuts each of the two opposing side surfaces and the front surface,
wherein the bottom surface abuts each of the two opposing side surfaces and the front surface, and
wherein the top, bottom, and two opposing side surfaces together define a complete loop around the nose portion.

28. The demolition shears of claim 1, wherein the top, bottom, and two opposing side surfaces together separate the front surface from all surfaces of the jaw body besides the surfaces of the nose portion.

29. The demolition shears of claim 1, wherein:
the front surface extends farther away from the jaw axis than the top surface extends away from the jaw axis, and
the front surface extends farther away from the jaw axis than the bottom surface extends away from the jaw axis.

30. The demolition shears of claim 1, wherein:
the top surface abuts both of the two opposing side surfaces;
the bottom surface abuts both of the two opposing side surfaces;
the front surface abuts both of the two opposing side surfaces; and
the top surface, bottom surface, and the two opposing side surfaces together form a continuous perimeter that separates the front surface from surfaces of the front jaw disposed rearwardly of the continuous perimeter.

31. The demolition shears of claim 1, wherein the front surface faces away from the jaw axis.

32. A demolition shears comprising:
a first jaw;
a second jaw pivotally connected to the first jaw for pivotal movement relative to the first jaw about a jaw axis, the second jaw comprising:
  a jaw body with a nose portion, the nose portion having top, bottom, front, and two opposing side surfaces, wherein the front surface abuts the top surface and the bottom surface, wherein the top surface faces away from a bottom most edge of the nose portion, and wherein the bottom surface faces toward the first jaw, and
  an indexable piercing tip comprising first and second piercing edges and first and second shearing edges, the indexable piercing tip being selectively attachable to the nose portion in: (1) a first operative position in which the first piercing edge is presented for piercing use and the first shearing edge is presented for shearing use, or (2) a second operative position in which the second piercing edge is presented for piercing use and the second shearing edge is presented for shearing use, wherein, when the indexable piercing tip is in the first or second operative positions, the indexable piercing tip encloses a majority of the top surface, a majority of the bottom surface, a majority of the front surface, and a majority of at least one of the two opposing side surfaces, wherein the second operative position is a position in which the indexable piercing tip is rotated 180° relative to the first operative position, wherein the indexable piercing tip comprises a first body and a second body that sandwich the nose portion therebetween when the indexable piercing tip is in the first or second operative position, wherein the top and bottom surfaces face away from each other, and wherein the side surfaces face away from each other.

33. The demolition shears of claim 1, wherein the top surface faces upward and bottom surface faces downward.

34. The demolition shears of claim 1, wherein when the indexable piercing tip is in the first or second operative positions, an interference fit between the indexable piercing tip and nose portion prevents the indexable piercing tip from being detached from the nose portion in a direction that is perpendicular to the jaw axis.

35. The demolition shears of claim 1, when the indexable piercing tip is in the first or second operative positions, the first body can only be detached from the nose portion by moving the first body away from the nose portion in a direction parallel to the jaw axis.

* * * * *